US010305862B2

(12) United States Patent
Bone

(10) Patent No.: US 10,305,862 B2
(45) Date of Patent: May 28, 2019

(54) SECURE COMMUNICATION WITH A MOBILE DEVICE

(71) Applicant: VODAFONE IP LICENSING LTD, Newbury Berkshire (GB)

(72) Inventor: Nick Bone, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 172 days.

(21) Appl. No.: 15/021,912

(22) PCT Filed: Sep. 12, 2014

(86) PCT No.: PCT/GB2014/052780
§ 371 (c)(1),
(2) Date: Mar. 14, 2016

(87) PCT Pub. No.: WO2015/036785
PCT Pub. Date: Mar. 19, 2015

(65) Prior Publication Data
US 2016/0234177 A1    Aug. 11, 2016

(30) Foreign Application Priority Data

Sep. 13, 2013  (GB) .................................. 1316370.4
Oct. 16, 2013  (GB) .................................. 1318339.7
(Continued)

(51) Int. Cl.
*H04L 29/06*        (2006.01)
*H04W 4/70*         (2018.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC ....... H04L 63/20; G06F 13/28; G06F 13/1689
See application file for complete search history.

(56) References Cited

U.S. PATENT DOCUMENTS 6,185,678 B1 *  2/2001  Arbaugh ............... G06F 21/575
                                                        713/2
8,997,179 B2    3/2015  Kruglick
(Continued)

FOREIGN PATENT DOCUMENTS

WO    WO-2014/071885      5/2014

OTHER PUBLICATIONS

Saied et al., A Distributed Approach for Secure M2M Communications, May 2012, 5th International Conference on New Technologies, Mobility and Security, pp. 1-7 (Year: 2012).*
(Continued)

*Primary Examiner* — Kenneth W Chang
(74) *Attorney, Agent, or Firm* — B. Aron Schulman, Esq.; Stites & Harbison, PLLC

(57) ABSTRACT

Method and system for securely communicating with a machine to machine, M2M, device comprising sharing a secret or data derived from the secret between the M2M device and a server. Establishing a connection between the M2M device and the server. Using the shared secret or data derived from the shared secret to establish cryptographic material on both the M2M device and the server. Securing communication between the M2M device and the server with a cryptographic protocol using the established cryptographic material. The cryptographic material is unrecoverable from the shared secret or data derived from the shared secret alone.

18 Claims, 8 Drawing Sheets

(30) Foreign Application Priority Data

| | | | |
|---|---|---|---|
| May 30, 2014 | (GB) | ................................... | 1409641.6 |
| May 30, 2014 | (GB) | ................................... | 1409643.2 |
| May 30, 2014 | (GB) | ................................... | 1409652.3 |
| May 30, 2014 | (GB) | ................................... | 1409663.0 |
| Aug. 22, 2014 | (GB) | ................................... | 1414997.5 |
| Aug. 22, 2014 | (GB) | ................................... | 1414999.1 |
| Aug. 22, 2014 | (GB) | ................................... | 1415003.1 |
| Sep. 9, 2014 | (GB) | ................................... | 1415927.1 |

(51) Int. Cl.

| | |
|---|---|
| *H04W 4/50* | (2018.01) |
| *H04W 4/14* | (2009.01) |
| *H04W 12/02* | (2009.01) |
| *H04W 12/04* | (2009.01) |
| *H04W 88/02* | (2009.01) |
| *H04W 88/06* | (2009.01) |
| *H04L 29/08* | (2006.01) |
| *H04W 28/08* | (2009.01) |
| *H04W 80/06* | (2009.01) |
| *G06F 21/60* | (2013.01) |
| *H04B 1/3816* | (2015.01) |
| *G06F 13/16* | (2006.01) |
| *G06F 13/28* | (2006.01) |
| *G06F 13/40* | (2006.01) |
| *H04W 4/12* | (2009.01) |
| *H04W 12/06* | (2009.01) |
| *H04W 52/02* | (2009.01) |
| *G06F 21/71* | (2013.01) |
| *H04L 9/08* | (2006.01) |
| *H04W 8/04* | (2009.01) |
| *G06F 9/4401* | (2018.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/029* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/02* (2013.01); *H04W 12/04* (2013.01); *H04W 12/06* (2013.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/14* (2018.01); *Y02D 10/151* (2018.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/168* (2018.01); *Y02D 70/21* (2018.01); *Y02D 70/22* (2018.01)

(56) References Cited

U.S. PATENT DOCUMENTS

| | | | | |
|---|---|---|---|---|
| 2002/0136410 | A1* | 9/2002 | Hanna | H04L 9/088 380/277 |
| 2002/0157002 | A1* | 10/2002 | Messerges | G06F 21/10 713/155 |
| 2004/0187001 | A1* | 9/2004 | Bousis | G06F 21/445 713/175 |
| 2007/0083750 | A1* | 4/2007 | Miura | G06F 21/445 713/155 |
| 2008/0256616 | A1* | 10/2008 | Guarraci | H04L 63/08 726/9 |
| 2011/0016321 | A1* | 1/2011 | Sundaram | H04L 63/061 713/171 |
| 2011/0091036 | A1* | 4/2011 | Norrman | H04L 9/065 380/44 |
| 2011/0252235 | A1* | 10/2011 | Dolan | H04W 4/70 713/168 |
| 2012/0054493 | A1* | 3/2012 | Bradley | H04W 8/005 713/171 |
| 2012/0159167 | A1* | 6/2012 | Lee | H04L 9/321 713/168 |
| 2014/0122878 | A1* | 5/2014 | Cho | H04L 67/02 713/168 |
| 2014/0310526 | A1* | 10/2014 | Pahl | H04L 9/0825 713/171 |
| 2015/0180653 | A1* | 6/2015 | Nix | H04W 4/70 380/259 |

OTHER PUBLICATIONS

International Search Report for International Application No. PCT/GB2014/052780, dated Jan. 23, 2015, European Patent Office, Rijswijk, NL.

United Kingdom Search Report for Application No. GB1415927.1, dated Feb. 2, 2015, Intellectual Property Office, Newport, South Wales, UK.

Master Thesis et al: "Leveraging Public-key-based Authentication for the Internet of Things", Master Thesis, Jul. 19, 2013 (Jul. 19, 2013), XP055161309, RWTH Aachen University, Germany Chair of Communication and Distributed Systems, Retrieved from the Internet: URL:http://people.inf.ethz.ch/mshafagh/Master_thesis_Hossein_Shafagh_PKC_in_the_IoT.Pdf [retrieved on Jan. 12, 2015] Chapters 2 and 5.

Exalted: "WP5—Security, Authentication & Provisioning. Deliverable 5.1 Security and Provisioning Solutions", Feb. 29, 2012 (Feb. 29, 2012), XP055161176, Retrieved from the Internet: URL:http://cordis.europa.eu/docs/projects/cnect/2/258512/080/deliverables/001-EXALTE DWP5D51.pdf, [retrieved on Jan. 12, 2015] Section 5.5, Section 5.7 and subsections.

"Lightweight Machine to Machine Technical Specification ; OMA-TS-LightweightM2M-V1_0-20130912-D_RM", OMA-TS-LIGHTWEIGHTM2M-V1_0-20130912-D_RM, Open Mobile Alliance (OMA), 4330 La Jolla Village Dr., Suite 110 San Diego, CA 92122 ; USA, No. 1.0, Sep. 12, 2013 (Sep. 12, 2013), pp. 1-101, XP064164725, Retrieved from the Internet: URL:ftp/Public_documents/DM/LightweightM2M/Permanent documents/ [retrieved on Sep. 12, 2013], Section 7 and subsections.

GEMALTO: "Corrections and Clarifications in Security text; M2M(12)19_121_CR_TS_102_690_R2_Removal_of_Kma_Alignment_ofClause_5_with_", ETSI Draft; M2M(12)19_121_CR_TS_102_690_R2_REMOVAL_OF_KMA_ALIGNMENT_OF_CLAUSE_5_WITH_, European Teleacommunicattons Standards Institute (ETSI), 650, Route Des Lucioles ; F-06921 Sophia-Antipolis ; France, vol. SmartM2M, Mar. 22, 2012 (Mar. 22, 2012), pp. 1-32, XP014214112, [retrieved on Mar. 22, 2012], Section 7.2 and subsections.

Sarikaya Huawei USA Y Ohba Toshiba R Moskowitz Verizon Business Systems Z Cao, China Mobile B: "Framework for Securely Setting Up Smart Objects; draft-sarikaya-solace-setup-framework-00.t xt", Framework for Securely Setting Up Smart Objects; Draft-

(56) References Cited

OTHER PUBLICATIONS

Sarikaya-Solace-Setup-Framework-00.T XT, Internet Engineering Task Force, IETF; Standardworkingdraft, Internet Society (ISOC) 4, Rue Des Falaises CH—1205 Geneva, Switzerland, Sep. 17, 2012 (Sep. 17, 2012), pp. 1-18, XP015084912, [retrieved on Sep. 17, 2012], Section 4 and subsections.

* cited by examiner

SECURE COMMUNICATION WITH A MOBILE DEVICE

FIELD OF THE INVENTION

The present invention relates to a method and system for communicating securely with a mobile device and in particular a machine to machine (M2M) device.

BACKGROUND OF THE INVENTION

Machine to Machine (M2M) devices are often numerous, hard-to-reach, and have constrained capabilities (owing to low cost, small size, low processing power or limited battery life). All of this makes their management, often remote, very complicated. Moreover, M2M devices often need to be managed in a secure manner. For example, they may contain information that is commercially sensitive and/or confidential for the one or more entities that manage and/or own said devices. There is a need to remotely manage and communicate with them in a secure way, while respecting these constraints.

One approach is to provide M2M devices with PKI keys for use in securing communications with a server or device manager. However, this increases complexity and requires such the maintenance of such a provisioning system.

Another approach is to use cryptographic material derived from an underlying key. However, if this key is ever compromised then an eavesdropper who has recorded previous communications can then decrypt these earlier messages.

Therefore, there is required a system and method that allows the M2M devices to communicate more reliably and more securely.

Details of 3GPP Standards and Technologies Used to Implement Aspects of the Method and System One of these architectures of 3GPP is a Generic Authentication Architecture (GAA), which is a complex of standards which is described, for example, in 3GPP TS 33.919 (entitled "3G Security; Generic Authentication Architecture (GAA); System description", currently it may be retrieved at http://www.3gpp.org/ftp/Specs/html-info/33919.htm).

Generic Bootstrapping Architecture (GBA) is a 3GPP standard defined in 3GPP TS 33.220 (entitled "Generic Authentication Architecture (GAA); Generic Bootstrapping Architecture (GBA)", it could be currently retrieved at http://www.3gpp.org/ftp/specs/html-info/33220.htm). GBA is part of the complex of standards called GAA (see above).

GBA is a standard which enables a shared secret to be derived (bootstrapped) from the existing security association between a mobile network and a SIM card. This involves a network element called a Bootstrapping Server Function (BSF). In other words, GBA leverages the security of a SIM card (UICC) to authenticate mobile equipment, and then derive key material for general-purpose applications.

GBA may be advantageously used to provide high-security to the communication between a client and the server, thus allowing remotely managing, controlling and, in general, communicating with a device in a high security manner. In particular, GBA (or a GBA-like architecture) is used for enabling a secure communication with the device (which, according to an aspect of the present disclosure, may be an M2M device), said communication being between a server and a client, the client being associated with the device, and wherein this communication is done for managing the device and/or services provided by (or via) the device, thus enabling a secure management of that device and/or the services provided by (or via) the device. In this way, the device and/or the services provided by (or via) the device can be safely, securely and efficiently managed in a remote manner via a remote server.

GBA has been developed mainly for securing mobile broadcast (e.g. pay TV and equivalents). Indeed, standards for Multimedia Broadcast Multicast Service (MBMS) rely on GBA. Similarly, Open Mobile Alliance (OMA) Mobile Broadcast Services Enabler Suite (BOAST) smartcard profile relies on GBA. To date, most of the limited number of deployments of GBA in the world has been for mobile broadcast. GBA has also been standardised as an optional feature in conjunction with presence services, and within miscellaneous "federated identity" services (e.g. Liberty Alliance, OpenID). In general, it is understood that GBA has been designed for use with mobile devices, such as mobile phones, laptop, computers, and many of the designed features have been provisioned with this in mind.

A variant of GBA, called "GBA Push", has been proposed for securing a message between a client and a DM server in the context of OMA Device Management Security. The OMA Device Management is specifically designed for management of mobile devices such as mobile phones, tablet, computers, etc.

A different recent standard document (TS 102 690) merely mentions, in the context of M2M communications, the use of a standard GBA to secure communications between a device/gateway service layer and a network service layer.

There are some alternatives for identifying/authenticating a mobile user/device to a service. All of these alternatives are simpler than using GBA. For example, mobile operators and service providers can use WAP header enrichment.

Alternatively, the service provider can request the user to enter their phone number, send an SMS one-time password to that phone number, and ask the user to read the SMS and enter the password. These alternatives all work well with mobile devices and operators already, so service providers use them, although they are not as secure as GBA.

Additionally, many service providers prefer to offer services to a huge range of mobile devices, many of which do not contain a SIM card (e.g. PCs, laptops, Wi-fi-only tablets etc.). Since GBA relies on a SIM card/UICC in order to work, there has been no interest in using it.

Strong security is not possible with current alternatives such as a user-entered PIN or a bootstrapping message delivered by an SMS. These alternatives would either not be feasible or they would not provide the required level of security. First, there might not be a user around to enter a PIN (as most M2M devices operate independently from human intervention). Second, the service provider may be likely to want strong security (e.g. because M2M devices may include critical infrastructure), whereas PIN-based bootstrapping has weaker security. Third, if a PIN or SMS-based bootstrapping goes wrong (server connects to wrong client, client connects to wrong server, or there is a Man-In-The-Middle), then the user is likely to notice, complain and get it fixed, whereas an M2M device is unlikely to notice and complain, so may be permanently compromised. Neither is particularly practical by way of existing methods. For example, the OMA Device Management uses GBA Push for securing a message between a client and a DM server, and there is no explanation of how a similar architecture could be used or even modified for managing the device. Moreover, as mentioned above, the OMA Device Management is not compatible for use with an M2M device, as discussed above. This is particularly true for low cost, simple M2M devices, such as simple sensors, switches, low cost trackers etc. Further, the standard document mentioned above uses a standard GBA to secure communications between a device/gateway service layer and a network service layer. Thus, the communication is not used for device/service management-related communications, and it is not clear, based on the observations made above, how a similar architecture could be used or even modified for managing the device from the server. Moreover, for the reasons mentioned above, the OMA Device Management and the standard document are incompatible, and a combination of the GBA Push for OMA Device Management with the standard document is not feasible, as it would result in the wrong device management protocol (i.e. one that is not suitable for M2M devices, particularly simple M2M devices), and some very laborious effort to make the two compatible and delete the elements which are redundant.

The OMA has defined a lightweight protocol for managing (as well as interacting with) M2M devices and managing services provided by M2M devices (e.g. remote control of attached sensors or machines). This protocol is called LWM2M, which is described in detail at http://technical.openmobilealliance.org/Technical/release_program/lightweightM2M_v1_0.a spx This protocol runs over the CoAP protocol (analogous to http)—more specifically CoAP over DTLS (coaps) which is analogous to http over TLS (https). However, coaps requires a secure association to be provisioned between a device and a network server (DM Server) while providing no strong means to provision such an association from scratch.

A security aspect of OMA LWM2M is defined in Lightweight Machine to Machine Technical Specification Candidate Version 1.0—10 Dec. 2013 (OMA-TS-LightweightM2M-V1_0-20131210-C).

In addition, there exists two protocols, the first one called DTLS defined in RFC 6347 (entitled "Datagram Transport Layer Security Version 1.2"; it could be currently retrieved at http://tools.ietf.org/html/rfc6347); the second one called CoAP defined in draft-ietf-core-coap-18 (entitled "Constrained Application Protocol (CoAP)"; it could be currently retrieved at http://datatracker.ietf.org/doc/draft-ietf-core-coap/). Both protocols are currently used in LWM2M. CoAP is still only an IETF draft (not a full RFC), and DTLS version 1.2 is also comparatively new (January 2012): versions of TLS have often existed as RFCs for several years before receiving widespread adoption.

The User Datagram Protocol (UDP) channel security for [COAP] is defined by the Datagram Transport Layer Security (DTLS) [RFC6347], which is the equivalent of TLS v1.2 [RFC5246] for HTTP and utilizes a subset of the Cipher Suites defined in TLS. (Refers to TLS Cipher Suite registry http://www.iana.org/assignments/tls-parameters/tls-parameters.xml) The DTLS binding for CoAP is defined in Section 9 of [CoAP]. DTLS is a long-lived session based security solution for UDP. It provides a secure handshake with session key generation, mutual authentication, data integrity and confidentiality.

The keying material used to secure the exchange of information within a DTLS session may be obtained using one of the bootstrap modes defined in Section 5.1.2 Bootstrap Modes of OMA LWM2M. The formats of the keying material carried in the LWM2M Security Object Instances are defined in Appendix E.1.1.

There also exists an authentication protocol HTTP Digest authentication, which is defined in RFC 3310 (entitled "Hypertext Transfer protocol (HTTP) Digest Authentication using Authentication and Key Agreement (AKA)", it can currently be retrieved at http://www.ietf.org/rfc/rfc3310.txt).

The GAA cluster of specifications TS 33.222 (entitled "Generic Authentication Architecture (GAA); Access to network application functions using Hypertext Transfer Protocol over Transport Layer Security (HTTPS)") defines a general approach for pre-shared key TLS (TLS-PSK, RFC 4279). This can currently be retrieved at http://www.3gpp.org/ftp/Specs/html-info/33222.htm). For example, see especially Section 5.4.

In particular, with reference to GBA, 3GPP Specification TS 33.220 defines the components and interfaces that are shown in FIG. 1. These are further described as:

NAF 122, the "Network Application Function" is a server-side component of an application that will be secured using GBA.

BSF, "Bootstrapping Server Function", 130 is a server-side component, which obtains authentication vectors from the HLR/HSS 140, and sends a challenge to the mobile device, "UE", 110 during the GBA protocol. On successful authentication, it derives the shared secret.

HLR/HSS 140, the "Home Location Register" or "Home Subscriber System", is the existing 3GPP system which stores subscription details and credentials (the K and IMSI) for each SIM card (UICC) issued by a mobile operator. It may be "GBA-aware" (so that it stores details for a GBA user subscription) or may be a legacy component.

UE, the "User Equipment", 110 is a mobile device containing a SIM card (UICC). The UE 110 supports a client application which communicates with the NAF 122, as well as a service which interfaces to the UICC, communicates with the BSF 130, and derives the shared secret before passing it to the client application. This service is (somewhat confusingly) called a "GAA Server" in TR 33.905 (entitled "Recommendations for Trusted Open Platforms", it can currently be retrieved at http://www.3gpp.org/ftp/specs/htmlinfo/33905.htm).

Ua 150 is the interface between the Mobile Device (UE) 110 and the Network Application Function (NAF) 120.

Ub 160 is the interface between the Mobile Device (UE) 110 and the Bootstrapping Server Function (BSF) 130. This is specified in detail in TS 24.109 (entitled "Bootstrapping interface (Ub) 160 and network application function interface (Ua) 150; Protocol details", it can currently be retrieved at http://www.3gpp.org/ftp/Specs/html-info/24109.htm).

Zh/Zh' 180 is the interface between the BSF 130 and the HSS or HLR 140. The Zh 180 interface is used with an HSS 140 that is "GBA Aware". The Zh' 180 interface is used with a legacy HLR or HSS 140. The Zh and Zh' 180 interfaces are specified in detail in TS 29.109 (entitled "Generic Authentication Architecture (GAA); Zh and Zn Interfaces based on Diameter protocol; Stage 3", it can currently be retrieved at http://www.3gpp.org/ftp/Specs/html-info/29109.htm) and TS 29.229 (entitled "Cx and Dx interfaces based on the Diameter protocol; protocol details", it can currently be retrieved at http://www.3gpp.org/ftp/Specs/html-info/29229.htm).

Zn 170 is the interface between the NAF 122 and the BSF 130: this can use either a Web Services protocol (SOAP over http) or the Diameter protocol (RFC 3588). This is specified in detail in TS 29.109 (see above).

There are a few other components and interfaces defined within the GAA standards, but these are not described in detail here.

There are several different versions of GBA defined in the standards. The flavours of GBA may include GBA-ME, GBA-U, GBA-SIM etc. The version called "GBA-ME" may require no special customizations of the UICC, except that the UICC does contain a 3G SIM (a USIM). However, other versions may be used. There may be a need to use the 2G variant of GBA (using a SIM rather than a USIM).

SUMMARY OF THE INVENTION

In accordance with a first aspect there is provided a method for securely communicating with a machine to machine, M2M, device comprising the steps of:

sharing a secret or data derived from the secret between the M2M device and a server;

establishing a connection between the M2M device and the server;

using the shared secret or data derived from the shared secret to establish cryptographic material on both the M2M device and the server; and securing communication between the M2M device and the server with a cryptographic protocol using the established cryptographic material, wherein the cryptographic material is unrecoverable from the shared secret or data derived from the shared secret alone.

Therefore a connection or communication channel may be opened providing no or weak security or authentication and then used to start a security protocol allowing a greater level of security or authentication. For example, the connection may use an unsecure WiFi hotspot. Whilst this connection doesn't have to be secure, it may be used to establish or authenticate material (e.g. keys) such that the cryptographic material is only made available to the M2M device and the server. The cryptographic material cannot be recovered by any other party, even if that party knows the shared secret. This provides the perfect forward secrecy.

Optionally, the step of using the shared secret or data derived from the shared secret to establish the cryptographic material may further comprise the steps of:

the M2M device generating or obtaining a public key;

the server authenticating the public key of the M2M device using the shared secret or data derived from the shared secret; and the server deriving the cryptographic material from the public key of the M2M device. The public key may have a corresponding private key. The M2M device may provide a new public key, retrieve a stored public key or obtain the key from elsewhere, for example.

Advantageously, the step of authenticating the public key of the M2M device may employ a communication between a bootstrapping server and the M2M device. Or a communication between the server and the bootstrapping server. For example the M2M device may pass a public key or certificate to a BSF as a parameter within the bootstrapping protocol. The BSF may pass the device's public key to a NAF as part of a GUSS or USS, for example.

Optionally, the step of using the shared secret or data derived from the shared secret to establish the cryptographic material may further comprise the steps of:

the server generating or obtaining a public key;

the M2M device authenticating the public key of the server using the shared secret or data derived from the shared secret; and the M2M device deriving the cryptographic material from the public key of the server. The public key may have a corresponding private key. The server may provide a new public key, retrieve a stored public key or obtain the key from elsewhere, for example.

Advantageously, the step of authenticating the public key of the server may employ a communication between a bootstrapping server and the M2M device, or a communication between the server and the bootstrapping server. For example, the BSF may pass the public key or certificate of the server (or an authority public key used to sign the server's certificate) to the M2M device as a parameter within the bootstrapping protocol. The BSF may create a certificate for the NAF, which the NAF can use when communicating with the device, for example.

Advantageously, the step of using the shared secret or data derived from the shared secret to establish the cryptographic material on both the M2M device and the server may further comprise the steps of:

the M2M device generating or obtaining a public key and a corresponding private key;

the server generating or obtaining a public key and a corresponding private key;

the M2M device authenticating the public key of the server using the shared secret or data derived from the shared secret;

the server authenticating the public key of the M2M device using the shared secret or data derived from the shared secret;

the M2M device deriving the cryptographic material from the public key of the server and the private key of the M2M device; and the server deriving the cryptographic material from the public key of the M2M device and the private key of the server. In this embodiment, the M2M device and server each generate a public/private key-pair, each use the shared secret to authenticate the other's public key. Each uses its own private key and the other's public key to derive the cryptographic material. This is one mechanism that prevents the cryptographic material from being derived or obtained from simply knowing the public keys and the original shared secret.

Preferably, the cryptographic material may be session keys to provide perfect forward secrecy. This means that if the secret is compromised then old or historic messages are not necessarily subject to unauthorised recovery.

Preferably, the cryptographic protocol may be TLS, SSL, or datagram transport layer security, DTLS. These may take the form of an Elliptic curve Diffie-Hellman key agreement protocol, for example.

Optionally, the shared secret may be generated by or stored within the M2M device and the shared secret or data derived from the shared secret are sent to the server. The shared secret may be pre-provisioned or generated on first power-up, for example.

Optionally, the method may further comprise the step of the server authenticating the shared secret. The server may in some embodiments, authenticate the shared secret (or derived material).

Optionally, the shared secret may be generated by or stored within the server and the shared secret or data derived from the shared secret are sent to the M2M device.

Optionally, the method may further comprise the step of the M2M device authenticating the shared secret. Optionally, both the M2M device and the server may authenticate shared secret (or derived material) generated or stored on the other entity.

Optionally, the data derived from the shared secret may be obtained by applying a hash function or other fixed key derivation function to the shared secret. Other derivation techniques may be used.

Optionally, the server may be a device management server, device management bootstrap server, a lightweight M2M, LWM2M, server, a LWM2M bootstrap server or a Network Application Function, NAF or other entity.

Optionally, the server may be a Bootstrapping Server Function, BSF.

Optionally, the method may further comprise the step of authenticating the shared secret or using the shared secret to authenticate either or both the M2M device and the server.

Advantageously, the connection established between the M2M device and the server may be unsecured or be only weakly secured.

Advantageously, the secured communication between the M2M device and the server is over the connection. In some embodiments the secured communication is over a separate connection.

Preferably, the step of securing the connection between the M2M device and the server further comprises providing Generic Bootstrapping Architecture, GBA, or GBA Push Info, GPI, messages over the connection or over a separate connection.

Optionally, the shared secret may be used to establish, protect, endorse or authenticate any one or more of a certificate, digital certificate, a self-signed certificate, or a certificate signed by an unknown or unverifiable certificate authority. Other material may be used. The private key may be held by the M2M device. The private key may be held by the server. Both the M2M device and the server may each hold a private key, and each corresponding public key or certificate is established, protected, endorsed or authenticated using the shared secret, for example.

Optionally, the shared secret may be used to establish, protect, endorse or authenticate an authority key or certificate. The authority key is then used to sign, endorse or authenticate a public key or certificate for the device and/or server. For example, the shared secret may be used to distribute a certificate authority (CA) certificate for a previously unknown CA.

Optionally, the shared secret may be used to verify that a public key or certificate is still valid (e.g. has not expired or been revoked), including an authority key or certificate. Or the shared secret may be used to authenticate an updated public key or certificate, including an authority key or certificate. For example, the shared secret may be used like this where the device does not have access to an accurate clock (so cannot check expiry time), or where the device cannot fetch revocation information like CRLs, or the shared secret may be used to update or replace CA certificates.

Preferably, the shared secret may be configured to expire at a predetermined time. Therefore, there is no need to actively expire material.

Optionally, the server may generate a transaction identifier configured to expire at a predetermined time and further wherein the expiry time of the shared secret corresponds with the expiry time of the transaction identifier.

Advantageously, the method may further comprise the step of obtaining information indicating current time from a trusted time source. Therefore, this may be relied upon to determine whether or not the shared secret has expired.

Preferably, the information indicating the current time may be obtained from messages from the trusted time source secured using GBA.

According to a second aspect, there is provided a system comprising:
   a server;
   one or more mobile or machine to machine, M2M, devices; and
   logic configured to:
      share a secret or data derived from the secret between the one or more M2M devices and the server;
      establish a connection between the one or more M2M devices and the server;
      use the shared secret or data derived from the shared secret to establish cryptographic material on both the M2M device and the server; and
   secure communication between the M2M device and the server with a cryptographic protocol using the established cryptographic material, wherein the cryptographic material is unrecoverable from the shared secret or data derived from the shared secret alone.

Optionally, the one or more M2M devices may be configured to generate or obtain a public key and a corresponding private key, and wherein the server is further configured to generate or obtain a public key and a corresponding private key;
   the one or more M2M devices are configured to authenticate the public key of the server using the shared secret or data derived from the shared secret;
   the server is configured to authenticate the public key of the one or more M2M devices using the shared secret or data derived from the shared secret;
   the one or more M2M devices are configured to derive the cryptographic material from the public key of the server and the private key of the M2M device; and
   the server is configured to derive the cryptographic material from the public key of the M2M device and the private key of the server.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and nonvolatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
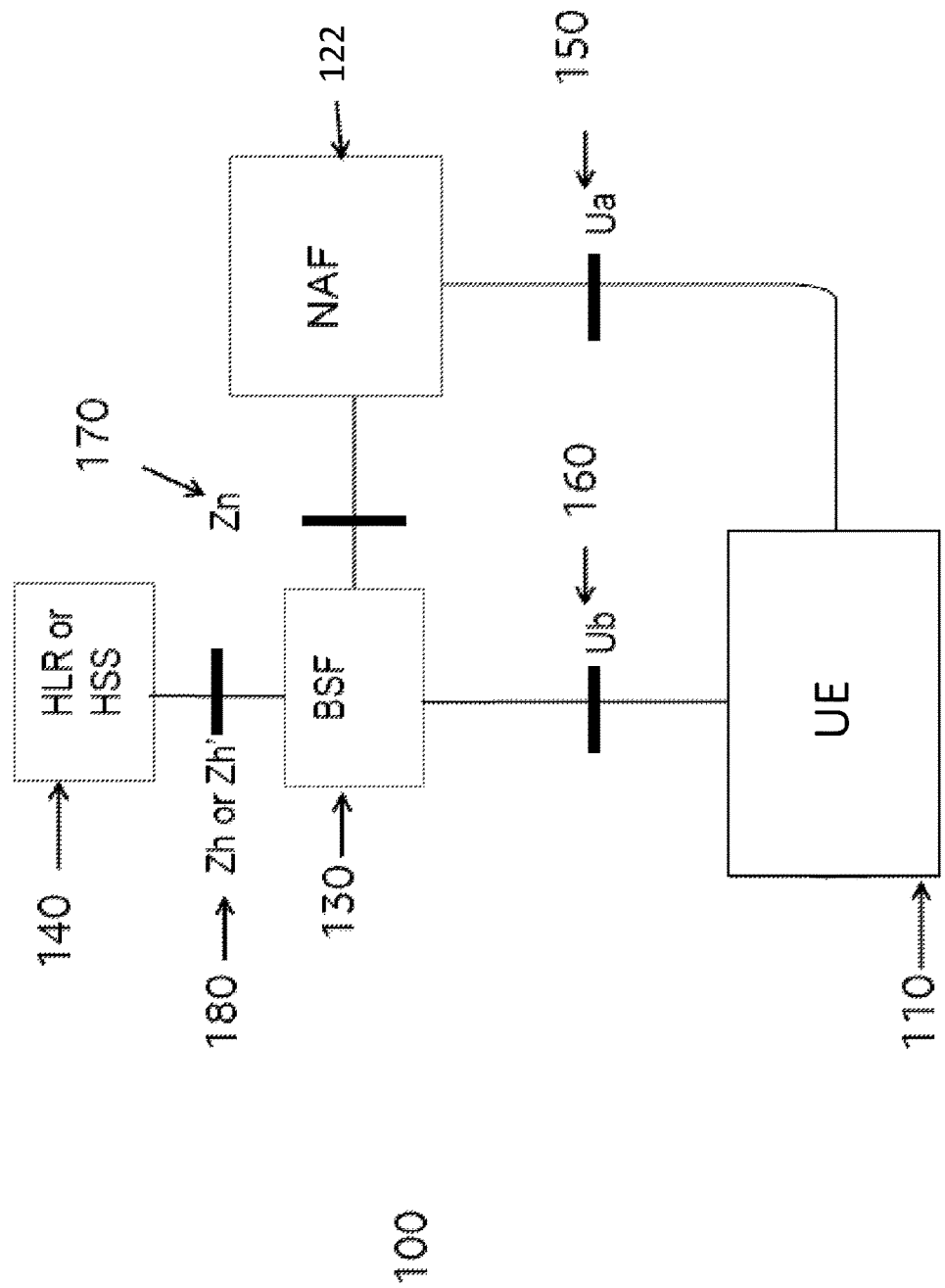
FIG. 1 shows a schematic diagram of components and interfaces with which GBA may be used.

A device may communicate securely with a server. The device may be a Machine to Machine (M2M) device, or an equivalent device (e.g. a device, a generic or specific communication device, including one or more modules capable of providing M2M capabilities).

Aspects of the Generic Authentication Architecture (GAA) and Generic Bootstrapping Architecture (GBA) are identified in "Details of 3GPP standards and technologies used to implement aspects of the method and system" above. In particular, the specific architecture on which the method and system may be based is GBA.

Generic Bootstrapping Architecture (GBA) uses existing security associations between a network (e.g. a mobile network) and a card (e.g. a SIM card or UICC) to derive a key that can be used for the secure communication between the client and the server. Accordingly, if the device is associated with such a card, as well as with the client, the method can advantageously use the GBA to derive the security elements (e.g. a shared secret) to enable the client associated with the device to securely communicate with the server. Accordingly, the device could be advantageously adapted so that it is associated with the card and the client and uses GBA to derive the security elements for secure communication with the server. Moreover, as GBA is standards-based, the impact of the required modifications may be relatively limited and the overall solution would be very attractive (in particular, to M2M users/owners as well as to network operators and/or service providers).

M2M devices are different from the mobile devices that OMA Device Management was originally designed for (such as mobile phones, laptops, computers, as explained in "Details of 3GPP standards and technologies used to implement aspects of the method and system" above), and use of GBA (in any of its versions) with M2M is not a straightforward implementation.

A variant of GBA, called "GBA Push" has been proposed for securing a message between a client and a DM server in the context of OMA Device Management Security, and is identified in "Details of 3GPP standards and technologies used to implement aspects of the method and system" above. It is noted that, although GBA Push and GBA are related, it is not trivial to use GBA in place of GBA Push (and vice versa). This is because these two architectures have some important differences. First, in GBA the device has to contact the BSF in order to request a RAND and AUTN (and use this to derive a Ks_local). To the contrary, in GBA Push, the client does not have to talk to the BSF—it just receives a message prepared by the BSF. Furthermore, in GBA, there is no need to modify the Ua interface. In GBA Push, either the Ua interface has to be modified in some way to carry the push message or a new interface must be added. Accordingly, GBA Push cannot be used with an arbitrary application protocol. For GBA Push, the application protocol has to be "GBA aware" in some sense (e.g. so it can carry the GBA Push Info (GPI) messages). In GBA, the Ks_local can be used to derive several different Ks_NAFs (e.g. for different application servers). In GBA Push, only one NAF can use/rely on the Ks_local. Accordingly, GBA Push is slightly less efficient than GBA.

The GBA Push Info is described in 3GPP TS 33.223, Section 5.2.1. The encoding is defined in Section 5.3.5. See in particular table 5.2.1.1 and figure 5.3.5.1 in 3GPP TS 33.223 V12.0.0 (2013-12) that may be found: http://www.3gpp.org/ftp/Specs/archive/33_series/33.223/33223-c00.zip Moreover, as discussed above, M2M devices are very constrained in their capabilities (e.g. computation, communication, life, etc.) and these constraints make their management more complex and harder to implement in a simple manner. GBA requires a number of interfaces and components which are hard to implement with M2M (for examples and description of these interfaces and components, please refer to the sections below).

In order to more efficiently and securely manage the device and/or services provided by (or via) the device, these interfaces and components need to be modified or otherwise adapted so they can properly and effectively work with M2M devices.

For example, carrying the Ub interface (and associated protocol) over constrained M2M devices is very difficult. For example, the standard Ub interface uses HTTP and HTTP digest. The likely rationale for this is that, as mentioned above, GBA was designed having mobile devices, such as mobile phones, in mind. So, since all phones use HTTP, and therefore all have an HTTP stack, then HTTP was the easiest protocol to be used for the Ub interface. However, this is not true for M2M devices. For example, according to the Lightweight M2M (LWM2M) protocol (see below for more details), a protocol called CoAP is used in M2M devices, precisely because it is a simpler/more efficient alternative to HTTP. Alternatively, this Ub interface could be tunnelled, for example via another interface (e.g. the Ua), so that the system may be simplified.

Additionally, building all the necessary components (e.g. GAA server, interfaces) into a capacity-constrained M2M device appears to be very difficult. For example, physical and virtual space constraints, as well as computational constraints, create considerable problems for building the necessary components. Moreover, having one or more interfaces between M2M application(s) and a card on the device, such as a UICC, is very difficult. This is due, for example, to the fact that most M2M modems do not support the required low level interface(s). In general, the overall integration of the GBA required interfaces and components with an M2M device appear very difficult. A possible, but not optimal solution, could be to pre-provision the M2M devices (e.g. having the M2M devices already designed and/or manufactured with the required components and interfaces) and the associated elements required for use of GBA (e.g. the card being capable of interfacing with the M2M device) so that the GBA could be used. To date, no M2M device is pre-provisioned with these characteristics.

In addition, as noted above, GBA is not widely used. There are other reasons why GBA is not widely used. For example, use of GBA requires support in the device, in the network (e.g. BSF—see below) and by individual services (which may be deployed, for example, by a mobile operator or by other parties). In the preferred use-case (mobile broadcast) support is also required in the SIM card (as it uses GBA-U). Accordingly, a lack of coordination and willingness to act/cooperate between the various parties involved in this deployment (e.g. device manufacturers, mobile operators, service providers) has so far blocked implementation of GBA.

For all the above reasons, GBA (or a GBA-like architecture, for example a variant and/or a suitably modified version) may be used for enabling a secure communication with a device (in particular, an M2M device). The communication may be between a server and a client, the client being associated with the device, and wherein this communication may be done for managing the device and/or services provided by (or via) the device. This enables a secure management of that device and/or the services provided by (or via) the device and creates a new and innovative combination which produces a synergistic effect and provides many technical advantages.

For instance, as already mentioned above, the GBA will provide a higher and very strong level of security to the device/service management-related communications with M2M devices, which is a very critical and important point.

Another advantage, in addition or combined with the strong security described above, is in terms of full automation. Moreover, an M2M service provider does not have the cost/complexity of setting up their own security solutions, as the solution can be provided directly by the mobile operator implementing the solution described in this application. In particular, a service provider does not have to set up a PKI, issue certificates, pre-load keys to devices and so on.

Accordingly, the method may further comprise that the provision of the secure communication is based on a security association between a network and a card, the card being associated with the device. For example, the card may be embedded within the device (e.g. soldered in the device) or provided to the device by way of a suitable connection. In general, the card may be associated in any suitable manner so that there is an association between the card and the device. The network can be a mobile network, or any equivalent network, while the card can be a SIM card, a UICC, or any card associated with the network. The method may further comprise deriving a shared secret based on the security association. The method may further comprise providing the client and the server with the shared secret so as to enable the secure communication. The server may be a server adapted to manage the device (e.g. remotely manage the device, send updates, transfer information to and from the device, control device parameters, etc.) and to manage services provided by the device (e.g. device is used to switch on/off and/or dim streetlights). The shared secret may be a key and/or a similar security arrangement.

The method may further comprise authentication between the client and the server. The authentication may be based on the shared secret. The authentication may be performed via an authentication component. The authentication may be performed by means of a first authentication between the client and an authentication component and of a second authentication between the server and the authentication component. The client and the server may be independently authenticated by an authentication component. As a result of the client and the server being authenticated by the authentication component, both the client and the server may share the shared secret. The authentication may be performed by means of the shared secret. The shared secret may be shared between the client and the server. Alternatively, the shared secret may be shared between the client, the server and the authentication component. The authentication may implicitly result from the client, the server and the authentication component sharing the shared secret. The method may further comprise deriving a second shared secret based on the shared secret, the second shared secret being shared between the client and the server. This second shared secret may then be used for the authentication as discussed above.

The obtainment of the shared secret at the client may be based on an identifier associated with a server authentication component. The shared secret may be obtained at the server from the authentication component. The obtainment of the shared secret at the server is obtained based on an identifier associated with the shared secret. The identifier is generated by the authentication component. The identifier may be provided to the server by the client.

The OMA LWM2M protocol for managing (as well as interacting with) M2M devices and managing services provided by M2M devices (as described in "Details of 3GPP standards and technologies used to implement aspects of the method and system") may be used. However, other device management protocols may be used or the method and system may be extended to other M2M services (for example, securing the delivery of binary SMS).

GBA could be advantageously used in conjunction with LWM2M in order, for example, to establish keys for LWM2M, whilst at the same time LWM2M and the procedures specified therein could be used to transport and/or carry any message and/or communication which relates to GBA. For example, this can be done by using specific tunnels (e.g. Ub) or GBA Push Info (GPI) messages. The use of GBA together with LWM2M creates a new and innovative combination which produces a synergistic effect and provides many technical advantages. For example, it allows addressing many more low-end devices, such as M2M devices. This is due, for example, to the use of a device management protocol which is properly optimized for M2M, rather than one repurposed from the consumer space (e.g. OMA DM v1, TR-069). This optimised protocol can be used to transport GBA messages—avoiding the need for a separate HTTP stack—and to manage GBA parameters (identifiers for device and application, lifetimes, key derivation methods, etc.). Further, when accompanied by appropriate network systems to provide automated routing and discovery (e.g. of LWM2M server and BSF), GBA and LWM2M advantageously combine to eliminate the cost of pre-loading settings and credentials, so facilitating low cost devices. GBA with LWM2M securely supports low-cost devices which are unattended or have no UI, where there is no option for user interaction (such as entry of PIN), and where there is no user who is able to notice and recover from authentication failures (spoof server, spoof client or Man In The Middle), Moreover, GBA works without requiring any public key or certificate processing on the device. This is particularly advantageous on simpler devices, as these devices may have minimal public key support or implementation errors when handling certificates.

Accordingly, the shared secret may be used as a key in the LWM2M standard. Also, the LWM2M standard procedures may be used for transmission and/or reception of any communication used within the GBA.

The shared secret may be used as a key or shared secret within the DTLS protocol (identified in "Details of 3GPP standards and technologies used to implement aspects of the method and system" above), either when the LWM2M is used in conjunction with a DTLS protocol or when the DTLS is used alone or in conjunction with one or more other protocols.

The secure communication may further be a data communication. The data communication may be an SMS-based communication. An SMS binding may be used. The data communication may be a UDP-based communication.

The method may further comprise encrypting a communication over the secure data communication. The encryption may be performed using an Advanced Encryption Standard. The SMS-based communication may be further secured by use of an Over-The-Air (OTA) protocol, e.g. a Secured Packet Structure for UICC Applications. This protocol is defined in ETSI standard 102.225. The OTA protocol may be arranged to secure the communication with the identification card associated with the device.

It has also been noted that the OTA protocol can be used advantageously in conjunction with the LWM2M standard, in which the LWM2M can be used to manage parameters, keys and similar elements for the OTA protocol.

The use of OTA with LWM2M is not a straightforward implementation. OTA is a solution designed for SIM card security, as it has some real technical challenges if used for LWM2M. In particular, while there is software written for SIM cards and SIM OTA servers to support ETSI standard 102.225, a similar software does not exist in the device management space for devices (and, in particular, not for OMA DM clients and servers). Thus, M2M device manufacturers do not have a code-base that they can easily adapt for use with these devices.

Further, the ETSI standard 102.225 does not explain how to set up the keys and parameters for use with the standard. It simply assumes the keys and parameters are all pre-loaded and known to both SIM card and OTA server. Although this assumption is acceptable in the SIM space—because SIM cards can be securely provisioned with the necessary keys at the manufacturing stage, and SIM manufacturers have interfaces with operators for communicating the necessary keys and parameters—the same cannot be said about LWM2M, where that infrastructure does not exist.

Thus, the use of OTA together with LWM2M creates a new and innovative combination which produces a synergistic effect and provides many technical advantages. For example, the SMS bearer needs to be secured, and so far no solution has been found. Use of OTA enables the SMS bearer to be used in LWM2M. Without it, it would not be possible to use SMS-based communications in LWM2M, and that would limit the applicability of the overall LWM2M standard.

Accordingly, the LWM2M standard procedures may be used to manage parameters and/or keys used in the OTA protocol. The method may further be used in conjunction with LWM2M, as described above.

It has also been noted that the method described above, implemented using the GBA (or a similar architecture), can be used in conjunction with SMS so that the GBA can be employed to establish keys for secure SMS-based communications (e.g. SMS), while at the same time SMS-based communications can be used to transport or carry messages associated with GBA—for example, carry GBA Push Info (GPI) messages. The use of SMS-based communications together with GBA creates a new and innovative combination which produces a synergistic effect and provides many technical advantages. For example, GBA can be used to establish the shared keys that are needed to protect SMS, while using SMS as a transport to deliver the necessary GBA messages. Further the SMS used to deliver the GBA messages can themselves be integrity protected (and partly encrypted) using the keys that will be established by GBA, so at no point is there a reliance on not secure SMS. This synergistic combination allow use of SMS as the sole bearer for M2M traffic, something which would not otherwise be possible, except by preloading the keys needed to secure SMS traffic, or switching to a different protocol to negotiate these keys: both of these alternatives would add complexity and cost. Thus, it would provide a very high security solution for obtaining shared keys so that the security of the keys is not compromised, and at the same time an-SMS-based communication is enabled by virtue of the provisioning of the keys.

Accordingly, when the method is implemented using GBA, the GBA may be used to establish keys for secure transmission and/or delivery of SMS. SMS-based communications may be used for transmission and/or reception of any communication used within the GBA, noting that these communications may themselves be protected using the keys that will be derived in GBA.

In addition to the above, the server may further comprise a server authentication component. Also, the client may further comprise a client authentication component. The server authentication component may perform authentication of the server with the authentication component. The client authentication component may perform authentication of the client with the authentication component.

Further, the authentication component may be a Bootstrapping Server Function (BSF), the server authentication component may be a Network Application Function (NAF) and the client authentication component may be a GAA Server.

The method may further comprise communicating between the server and the client for determining security parameters to be used for the secure communication, wherein the communicating is performed by using a device management protocol (for example, the GBA). The secure communication may be for use in the device management protocol.

In a further embodiment, there is provided a method of enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. The device can be an M2M device.

In a further embodiment, there is provided an apparatus, system, module or network for enabling secure communication with a device, said communication being between a server and a client, the client being associated with the device. In addition, the apparatus, system, module or network may further include means for performing any one of the steps or features of the methods described above. The device can be an M2M device.

In a further embodiment, there is provided an apparatus, system, module or network for enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. In addition, the apparatus, system, module or network may further include means for performing any one of the steps or features of the methods described above. The device can be an M2M device.

In a further embodiment, there is provided a client including any means, features or functionalities corresponding to the means, features or functionalities relative to the client as recited by any one of the methods described above.

In a further embodiment, there is provided a server including any means, features or functionalities corresponding to the means, features or functionalities relative to the server as recited by any one of the methods described above.

In a further embodiment, there is provided a device comprising a card and a client, wherein the device is arranged for enablement of secure communication, the secure communication being between a server and the client, wherein the provision of the secure communication is based on a security association between a network and the card. The client may comprise any means, features or functionalities corresponding to the means, features or functionalities relative to the client as recited by any one of the methods described above. The device can be an M2M device.

In a further embodiment, there is provided a server arranged for enablement of secure communication with a device, the secure communication being between the server and a client associated with the device, wherein the provision of the secure communication is based on a security association between a network and a card, the card being associated with the device. The server may comprise any means, features or functionalities corresponding to the means, features or functionalities relative to the server as recited by any one of the methods described above. The device can be an M2M device.

In a further embodiment, there is provided a system for enabling secure communication with a device, said communication being between a server and a client, the client being associated with the device, wherein the provision of the secure communication is based on a security association between a network and a card, the card being associated with the device. The device can be an M2M device.

In a further embodiment, there is provided a method of enabling secure data communication with a device, the communication being between a server and a client associated with the device, wherein the security of the communication is enabled by a bootstrapped secret. The device can be an M2M device. The security protocol may be used to secure the data communication. The bootstrapped secret may be used to obtain the security elements used for the secure protocol. The bootstrapped secret may be a pre-shared secret, said secret being directly provided to the server and the client. The pre-shared secret may be permanently provided to the server and the client (e.g. by pre-provisioning the client and/or the server with said pre-shared secret, e.g. at manufacturing stage or before the client and/or server are used in a system). The pre-shared secret may be a strong, high entropy or a temporary, low-entropy pre-shared secret. The bootstrapped secret may be based on a public key or a certificate-based method. The bootstrapped secret may be provided via a bootstrap server. The security elements can be keys and/or similar arrangements well known in the art.

The communication may be an SMS-based communication. The security protocol is defined by ETSI TS 102.225. The method may use SMS binding. The device may be further associated with a card, and the security of the data communication may be controlled by means of the card. Any incoming SMS-based communication may be decrypted and/or checked by means of the card, and/or any outgoing SMS-based communication may be encrypted and/or checked by means of the card.

The communication may be a UDP-based communication. The security protocol may be a DTLS protocol.

The secure data communication may be provided over a communication interface. The communication interface may be used for managing the device of for managing the bootstrapping operations.

The data communication may be performed according to the LWM2M protocol.

In a further embodiment, there is provided an apparatus, system, module or network for enabling secure data communication with a device, the communication being between a server and a client associated with the device, wherein the security of the communication is enabled by a bootstrapped secret. The device can be an M2M device.

In a further embodiment, there is provided a method of retrieving security elements required for enabling secure data communication with a device, the communication being between a server and a client associated with the device, wherein the security elements are retrieved using a bootstrapping protocol. The device can be an M2M device. The bootstrapping protocol may retrieve the security elements in a secure session. The session may be secured based on a security protocol. The security protocol may be a DTLS protocol. The bootstrapping protocol may be based on GBA. The data communication may be an SMS-based communication. The bootstrapping protocol may be a LWM2M bootstrap protocol. The security elements can be keys and/or similar arrangements well known in the art.

In a further embodiment, there is provided an apparatus, system, module or network for enabling secure data communication with a device, the communication being between a server and a client associated with the device, wherein the security elements are retrieved using a bootstrapping protocol. The device can be an M2M device.

The secure communication may be for the purpose of managing the device and/or the client and/or services (e.g. provided by the device) by the server. Both the device and the server may be machines (i.e. not requiring any human intervention to work). When the device is a machine, the server may be used to manage it. Again, the management may be done without any human intervention (e.g. automatically).

As discussed above, the solution could be used in conjunction with the LWM2M protocol, but the solution could be extended to other Device Management protocols, or to other M2M services (e.g. securing delivery of binary SMS). In particular, and as discussed above, the use of the solution in conjunction with an M2M-specific protocol, such as LWM2M, allows the solution to be very efficient when used with M2M devices, and in particular, when used to manage the device and/or services provided by (or via) the device. In other words, all the advantages mentioned above are further enhanced and optimised when the solution is used in conjunction with an M2M-specific protocol.

In addition, there is also provided any aspects or combination of aspects according to any one of the claims.

Any combination of the features described in connection with any of the aspects is also provided, even if not explicitly disclosed.

Figure 2:
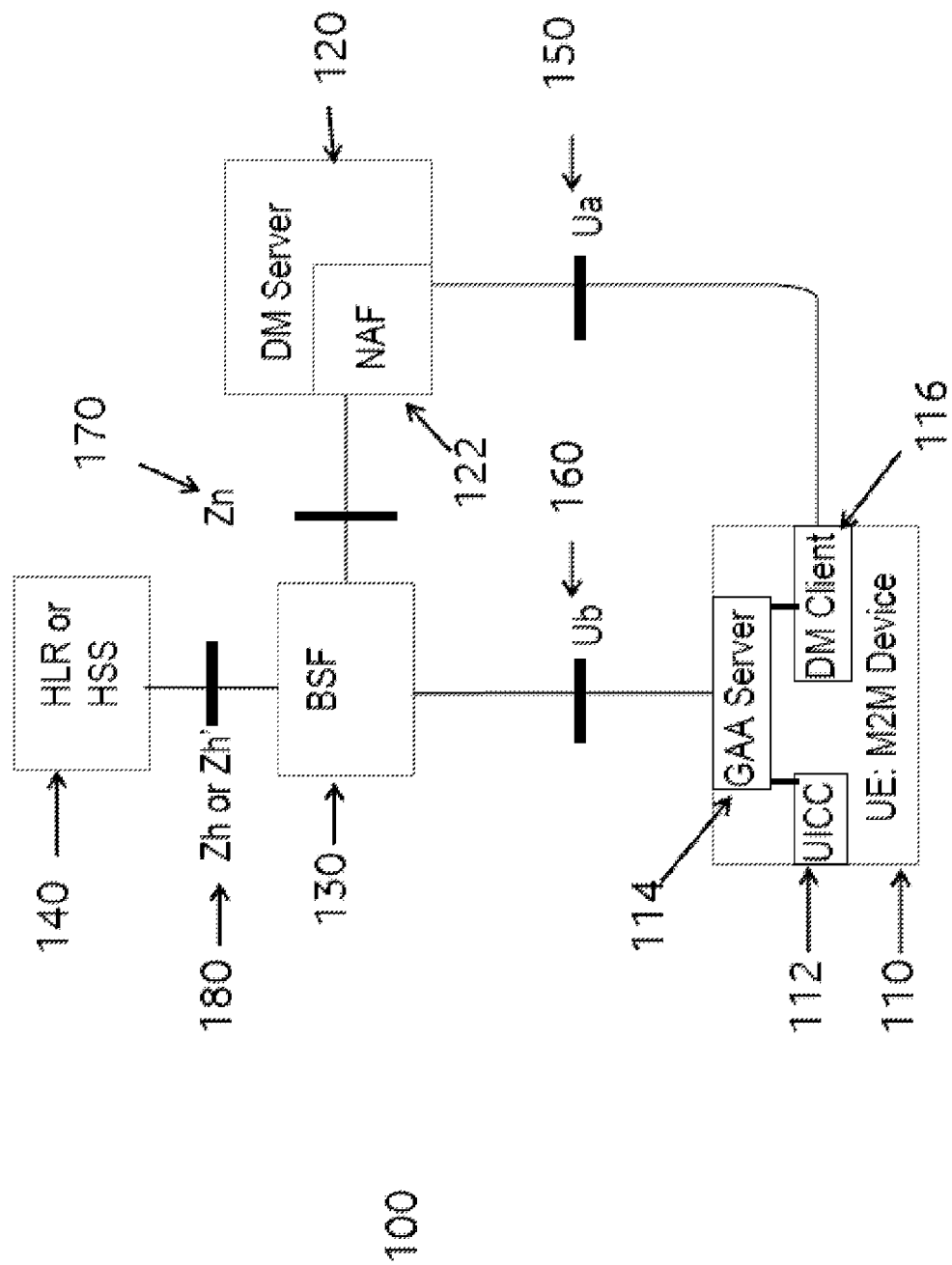
FIG. 2 shows a schematic diagram of an example of an architecture that can be used in accordance with the present invention, in particular when GBA is used.

With reference to FIG. 2, an exemplary architecture (100) is shown that may be implemented, in particular when GBA is used. A device 110 (in the example, an M2M Device and/or a User Equipment) is associated with a card 112 (in the example, a UICC) and a Client 116 (in the example, a Device Management (DM) client. Note that this client could also be an LWM2M Client, namely a client that can manage the device itself and service/applications provided by the device e.g. asset control). The device 110 is also associated with a device authentication component 114 (in the example, a GAA server). Further, a server 120 is provided (in the example, a DM server), the server associated with a server authentication component 122 (in the example, a Network Application Function (NAF)). Further, an authentication component 130 is provided (in the example, a Bootstrapping Server Function (BSF)) and a register 140 (in the example, an HLR or HSS). Also, four different interfaces are provided for communication between the various components, in particular interface Ua 150 between device 110 and server 120, interface Ub 160 between device 110 and authentication component 130, interface Zn 170 between authentication component 130 and server 120, and interface Zh/Zh' between authentication component 130 and register 140.

In particular, with reference to GBA, document TS 33.220 defines the following components and interfaces, which are shown on FIG. 2. NAF, the "Network Application Function", is a server-side component of an application that may be secured using GBA. In a preferred embodiment, the NAF may be a software component within a Device Management (DM) Server.

Some aspects of a BSF, HLR/HSS, UE, Ua, Ub, Zh/Zh' and Zn are provided in "Details of 3GPP standards and technologies used to implement aspects of the method and system" above.

On successful authentication of the device 110, the BSF 130 derives the shared secret Ks_NAF, which is retrieved by the NAF. In a preferred embodiment, the BSF 130 would most likely be on a separate server from the HLR/HSS 140, but within an M2M platform cluster.

The HLR/HSS may be "GBA-aware" (so that it stores details for a GBA user subscription) or may be a legacy component. In a preferred embodiment, the HLR/HSS would be the HLR or HSS of an M2M mobile operator (i.e. one dedicated specifically to serving M2M connections).

The UE 110 is, in the proposed solution, an M2M device.

In a preferred embodiment, the Ua is the interface between a Device Management client 116 and Device Management server 120.

In a preferred embodiment, the Ub would be the interface between the "GAA Server" component 114 of the device and the BSF 130.

In a preferred embodiment, the Zn interface is used.

In the proposed solution, this interface is between the Device Management Server 120 and the BSF 130. The WS version of the interface would allow placement of a DM Server in multiple locations (not just in the M2M operator/platform cluster), and allow future NAFs in multiple locations.

Figure 3:
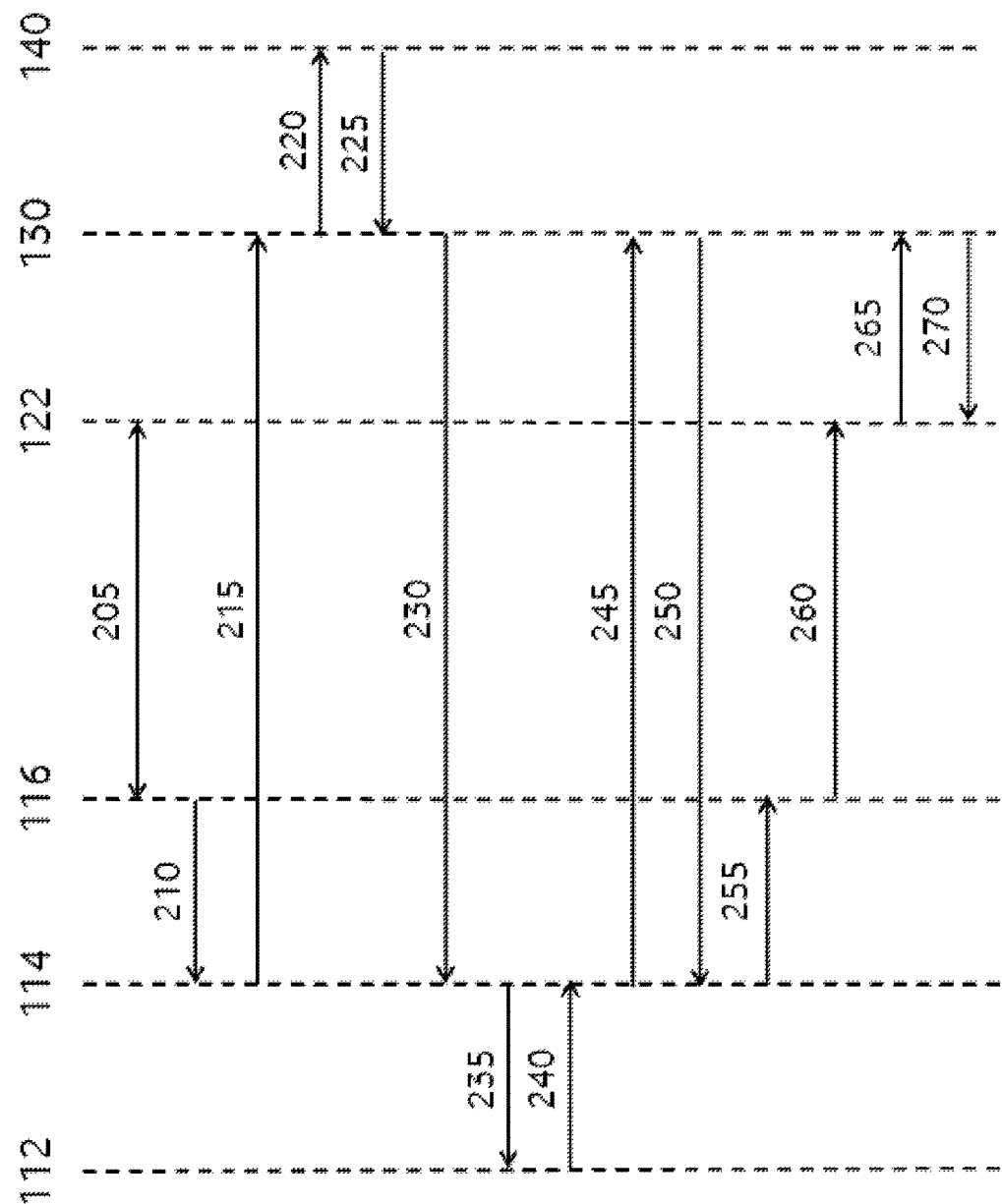
FIG. 3 shows an exemplary flow diagram of communications exchanged within the exemplary architecture of FIG. 2.

With reference to FIG. 3, the procedure for setting up the secure communication in accordance with the present invention is now described, in particular when GBA is used.

At 205, the UE 110 contacts over interface Ua the NAF 122 (in the described embodiment, the Device Management client 116 contacts the Device Management server 122) and discovers that the NAF requires it to acquire a shared secret using GBA. This could be because there is no existing secret, or the existing secret has expired, or is otherwise considered invalid by the NAF.

The exact interface and communication method may be specific to the application concerned. One possible interface and communication method for OMA Lightweight M2M is discussed below.

Over the internal UE interface from DM client to GAA server: at 210, the DM client 116 requests the GAA server 114 to obtain a shared secret. It presents an identifier for the corresponding NAF (NAF_Id).

Over the Ub Interface: at 215, The UE 110 contacts the BSF (GAA Server 114 contacts the BSF 130). This may be a basic http GET request. The UE presents an "IMPI" (equivalent of an IMSI) or a "TMPI" (equivalent of a TMSI) for anonymity reasons, if one is available.

Over the Zh or Zh' Interface: at 220, the BSF 130 requests an authentication vector from the HLR/HSS 140. At 225, the HLR/HSS 140 returns a fresh vector, consisting of a RAND, AUTN, XRES, CK, and IK, for example.

The BSF 130 generates a transaction identifier (B-TID) and passes (230) the B-TID together with the RAND and AUTN back to the UE 110. It may also indicate the lifetime of the B-TID, and the associated key.

Over the internal UE interface from the GAA Server to the UICC: at 235, the GAA Server 114 forwards the RAND and AUTN to the UICC 112 which validates the AUTN. If the AUTN is valid, then the BSF 130 is authenticated. At 240, the UICC 112 returns a RES, CK and IK to the GAA Server 114.

At 245, the UE 110 (GAA Server 114) contacts the BSF 130 again, using the resulting RES for HTTP Digest authentication (which is identified in "Details of 3GPP standards and technologies used to implement aspects of the method and system" above).

The BSF 130 verifies the HTTP Digest using the XRES. If it matches, then the UE 110 has been successfully authenticated. The BSF 130 stores the tuple <IMPI, B-TID, RAND, CK, IK> and tells at 250 the UE 110 that the authentication was successful. The UE 110 stores <B-TID, RAND, CK, IK>.

Over the internal UE 110 interface from DM client 116 to GAA server 114: the UE 110 (GAA Server 114) derives a secret Ks_NAF using the CK, IK, RAND, IMPI and NAF_Id. At 255, it passes Ks_NAF and the B-TID back to the DM client 116.

Over the Ua interface again: at 260, the UE 110 (DM Client 116) contacts the NAF (DM Server 122) and presents the B-TID as retrieved above.

Over the Zn Interface: at 265, the NAF 122 contacts the BSF 130, and presents the BTID. The BSF 130 authenticates the NAF, derives the corresponding Ks_NAF, and at 270 returns it to the NAF, together with an indicator of key lifetime.

The UE 110 (DM Client 116) and NAF (DM Server 122) now both share Ks_NAF. They can use it directly, or to derive their own session keys for further communication.

Again, the exact interface and communication method may be specific to the application concerned. One possible interface and communication method for OMA Lightweight M2M is discussed below.

As discussed above, the solution could be used in conjunction with the LWM2M standard. This standard can be viewed as a successor to existing OMA Device management standards (OMA DM 1.0 to 1.3), but heavily optimized for low end machine-type devices, and with an extended management scope beyond the device itself including the management of services provided by the M2M device such as asset control. This contrasts for instance with OMA DM 2.0 which is the successor for consumer devices like smartphones, tablets etc. Other widely-used Device Management standards include TR-069, which was developed by the Broadband Forum for managing Customer Premises Equipment (in particular DSL modems).

The exemplary flow described with reference to FIG. 3 is very generic, and can be used with many different sorts of device management protocols (or other application protocols). As can be seen, many details of the Ua interface are outside the scope of 3GPP and are left to other standards to complete (or left to proprietary implementations). However, integration with the LWM2M standard is possible, as described in these examples.

Under the specification (see above), the security for OMA LWM2M is based on DTLS v1.2 (see above) and CoAP (see above). Both the client and server must support pre-shared key DTLS (e.g. see section 7.1.1, page 41), whereas support for certificate-based authentication is only optional. This means that a key derived by GBA (Ks_NAF) could be used as a DTLS pre-shared key and it would work with any DM client/DM server pair.

The general approach for pre-shared key TLS is referenced in "Details of 3GPP standards and technologies used to implement aspects of the method and system" above. The GBA and TLS-PSK protocols work well together. In 205 described above, the "Server Hello" message contains a field where the server can indicate that it supports GBA-bootstrapping, and in response, the client can then provide an identifier (B-TID) for an already bootstrapped key (260). Or if the client doesn't already have a bootstrapped key, it asks the GAA server to get one, before resuming the "Client Hello" and "Server Hello" at 260. The use of the Ks_NAF to derive session keys is then specified entirely within the TLS-PSK protocol. The 3GPP spec assumes HTTP/TLS, but the basic approach looks the same for CoAP/DTLS.

To improve consistency with the OMA profile of GBA, the LWM2M spec may need to define a "protocol identifier" for DTLS pre-shared key and have it registered by OMNA (see section 5.2.1 of OMA GBA Profile, Approved Version 1.1—31 July 2012 found at http://technical.openmobilealliance.org/Technical/release program/sec_cf_archive.aspx).

Aside from GBA aspects, the M2M device may be configured to support the security of OMA LWM2M, which is referenced in "Details of 3GPP standards and technologies used to implement aspects of the method and system" above.

Additional Aspects

1. Device Development for GBA

As can be seen from FIG. 2 and FIG. 3, the M2M device may contain several internal components. It should support a DM client which is "GBA aware", as well as a "GAA Server" component.

The GAA Server component should support internal interfaces to the DM client and to the SIM card (UICC) as well as the external Ub interface to the BSF. The interface to the UICC may be particularly challenging, as the M2M device may not expose an existing API to allow device software to send commands to the UICC. One possibility (that may be used) is for the modem to expose AT commands. However, this may not be at a sufficiently low level (AT+CSIM allows raw APDUs to be communicated to the UICC) in every case. Further, there may be security issues: while the GAA Server must be able to interface to the UICC, general applications installed on the device should not be able to use this interface, as that could allow external parties to impersonate the device (and engender fraud on the cellular network). So the API to the SIM Card should be privileged, as well as being sufficiently low level to be usable.

2. Ub Tunnelling, or GBA Push

The interface to the BSF is based on http and HTTP Digest authentication. One alternative may be "tunnelling" the Ub interface within the Ua interface, so that the device only needs to support the CoAP protocol (not HTTP as well).

A related alternative is using the GBA "Push" variant, and carrying push messages (Upa interface) within the Ua interface. Both of these would require identifying suitable commands and parameters in the Ua interface (i.e. the relevant Device Management protocol) to carry the tunnel or push messages. The interfaces and message flow for GBA push are outlined below (see also 3GPP TS 33.223, entitled "3G Security; Generic Authentication Architecture (GAA); Generic Bootstrapping Architecture (GBA) Push function", it can currently be retrieved by http://www.3gpp.org/ftp/Specs/htmlinfo/33223.htm).

Figure 4:
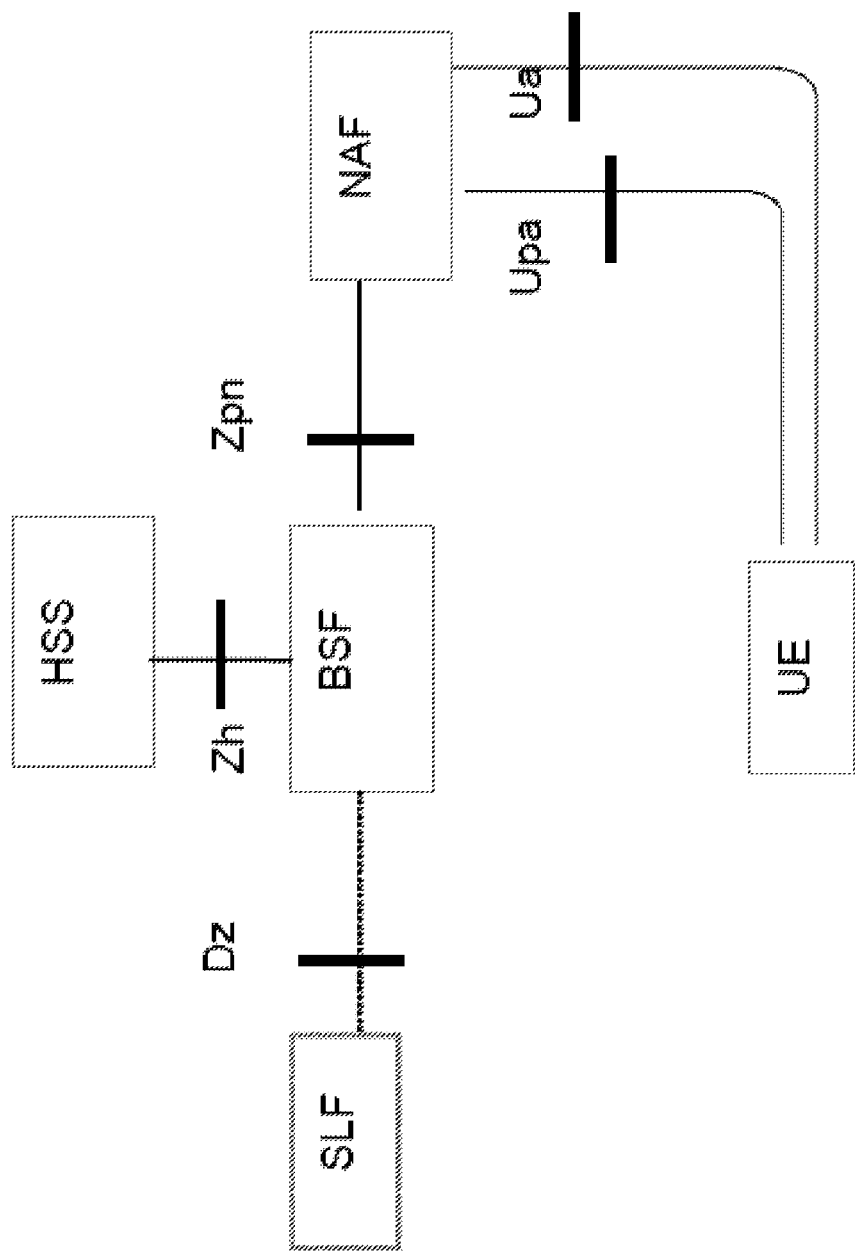
FIG. 4 shows a schematic diagram of an example of an alternative architecture that can be used in accordance with the present invention, in particular when generic bootstrapping architecture (GBA) is used.

With reference to FIG. 4, an example Processing and message flow for GBA Push follows:

1. A NAF establishes a shared NAF SA with a UE which is registered for Push services. It knows the identity of the subscriber.

2. The Push-NAF generates the GPI (GBA Push info) Request and sends the GPI Request to the BSF.

3. Upon receiving the request from the NAF, the BSF checks that the NAF is authorized, and resolves the requested subscriber identifier to a private identifier (e.g. IMSI).

4. The BSF fetches a new AV (authentication vector) and subscriber's GUSS (GBA User Security Settings) from the HSS.

5. The HSS sends the AV and the GUSS to the BSF.

6. When the BSF receives the AV Response from the HSS, it generates the NAF keys based on the requested NAF_Id and creates the relevant GPI Response.

7. The BSF sends the GPI Response to the NAF.

8. The NAF stores the received information together with other user information in a NAF SA.

9. The NAF then forwards the GPI to the UE over Upa using the selected transport mechanism and the given transport address.

10. When the UE receives the message containing the GPI, it processes the GPI as for regular GBA, and stores the corresponding NAF SA(s)

The UE and NAF are now ready to use the established NAF SA.

TR33.223 specifies that Upa is a new interface that is separate from Ua—"a new reference point Upa is introduced between the NAF and the UE" (Section 4.2.1). As such, the Ua interface should be unaware of whether GBA or GBA-push is being used.

3. Provisioning the Address of the BSF and the NAF

The address of the BSF (http URL) may be pre-loaded when the device is manufactured. It could be device managed itself, which would seem to create a "chicken-and-egg" problem, but the DM Server could, for instance, provide an address for an acceptable BSF in the ServerHello. Or http traffic might be routed by the M2M mobile operator to a default BSF address. Similarly, the location of the preferred DM Server might need to be pre-loaded, or the M2M mobile operator could route CoAP traffic to a default DM Server address.

4. Flavour of GBA (GBA-ME, GBA-U, GBA-SIM Etc.)

Several different versions of GBA are referenced in "Details of 3GPP standards and technologies used to implement aspects of the method and system". GBA-U has security advantages, but also logistic advantages: it permits a longer lifetime for the B-TID as the derived key is stored more securely. It allows safe retention of Ks during power-off cycles for instance. GBA-U requires specific support from the UICC, so would have a (modest) increment to the cost. Since M2M devices are typically provided with a new UICC anyway at manufacture, it is a software/development cost rather than a hardware cost. Also, in a model with a customised UICC, this may allow for a solution using restricted AT commands to the modem, rather than full AT+CSIM.

5. Location of the NAF (DM Server) and Type of Zn Interface

The architecture example allows for there to be several DM Servers in different locations: it could be part of an M2M platform (e.g. M2M mobile operator) cluster, or hosted elsewhere by a network operator/service provider, or perhaps by a customer of said operator/provider. The BSF may need to be located within a firewalled Demilitarized Zone (DMZ), or perhaps connected via an http proxy in the DMZ (so allowing external http Web Service access from NAFs), and then would execute the Diameter interface to the HLR/HSS. It may be undesirable to expose an http interface directly onto the server supporting the HLR, or to tunnel Diameter through firewalls. However, if the DM Server is itself part of the M2M platform cluster then this may be over-engineering. Possibly, a Diameter solution for the Zn interface then becomes acceptable.

6. Use of Zh or Zh' Interface

Ideally, the HLR may be upgraded to a full HSS with support for the Zh reference point. However, if the HLR/HSS only supports Zh' then the BSF will need to be more complicated, and take on some of the subscription management functions (profiling, lifetime, security policies) typically associated with the HSS.

7. Development of NAF Component

While the NAF functionality looks fairly straightforward, it will need to be developed for each DM Server used, and for each additional application which uses GBA.

GBA keys could be used to protect SMS (e.g. encrypt/integrity protect SMS using a secure packet interface e.g. like ETSI TS 102.225 which is used for SIM OTA). This SMS channel is likely to be more efficient than DTLS.

In addition, regardless of GBA, a secure SMS protocol could be linked to a Device and/or Service management protocol, namely: using a secure SMS protocol (e.g. originally designed for SIM OTA (102 225)), but now adapted for LWM2M communications, combined with using the LWM2M protocol to define (and manage) the necessary parameters for the secure SMS protocol (i.e. the relevant KIc, KID, SPI, TAR, and keys).

GBA could be used to securely derive the keys.

Further aspects and advantageous or preferable features are described in the following paragraphs.

LWM2M needs a security solution for the SMS bearer. Without a solution, SMS will not be usable as a bearer, severely limiting scope of LWM2M. A solution to this problem is to use SIM OTA security (e.g. see TS 102 225).

TS 102.225 relies on the keys and parameters being already agreed between client and server. However, it is difficult to pre-load these into LWM2M client devices, and ensure that they are sent to servers, because there is no present infrastructure for doing so. It would be pointless to deliver the keys and parameters over unsecured SMS.

There are various proposed solutions for delivering these keys and parameters in a secure way.

In a first solution, there is provided switching bearer to UDP/Coap and running DTLS. The DTLS session can be used to secure the LWM2M Bootstrap protocol. The LWM2M Bootstrap can be used to set the TS 102.225 keys and parameters securely. Note that managed resources/objects need to be defined to allow the Bootstrap server to update them; the format of these resources is specified in the numbered paragraphs below.

In a second solution, there is provided relying on a SIM card (UICC) which has already having been provisioned with keys and parameters, and using this card to terminate TS 102 225 security. Please note that, because this solution provides a secure channel, the same channel can be used to deliver other keys and parameters.

In a third solution, there is provided use of GBA to set up the keys and parameters. This works because the GPI (GBA Push Info) can be delivered over unsecured SMS. So, there is no requirement to have an initial key to protect the SMS. (Note that the delivery of the parameters like Kic, KID, SPI and TAR is not obvious, but these are only 6 bytes, and there are fields in the GPI e.g. App_Lbl, NAF_Id, P-TID which could be used to carry this info.)

Further details are provided in the numbered paragraphs below.

UDP channel security for [COAP] is referenced in "Details of 3GPP standards and technologies used to implement aspects of the method and system" above.

Since the LWM2M protocol utilizes DTLS for authentication, data integrity and confidentiality purposes, the LWM2M Client and LWM2M Server SHOULD keep a DTLS session in use for as long a period as can be safely achieved without risking compromise to the session keys and counters. If a session persists across sleep cycles, encrypted and integrity-protected storage SHOULD be used for the session keys and counters.

Note that the Client-Server relationship of DTLS (i.e. who initiated the handshake) is separate from the Client-Server relationship of LWM2M.

Considering that any device with a LWM2M Client can be managed by any LWM2M Server and LWM2M Bootstrap Server the choice of Cipher Suites is not limited to the list defined in Section 9 of [CoAP]. Due to the sensitive nature of Bootstrap Information, particular care has to be taken to ensure protection of that data including constraints and dependencies within a LWM2M Client/Bootstrap Server relationship according to the adopted security mode.

Concerning Bootstrap from a Smartcard, the same care has to be taken and a secure channel between the Smartcard and the LWM2M Device SHOULD be established as described in Appendix H of OMA LWM2M in reference to GlobalPlatform Secure Channel Protocol 03 (SCP 03) Amendment D v1.1 September 2009.

The keying material used to secure the exchange of information using a DTLS session may be obtained using one of the bootstrap modes referenced in "Details of 3GPP standards and technologies used to implement aspects of the method and system" above.

The Resources (i.e. "Security Mode", "Public Key or Identity", "Server Public Key or Identity" and "Secret Key") in the LWM2M Security Object that are associated with the keying material are used either 1) for providing UDP channel security in "Device Registration", "Device Management & Service Enablement", and "Information Reporting" Interfaces if the LWM2M Security Object Instance relates to a LWM2M Server, or, 2) for providing channel security in the Bootstrap Interface if the LWM2M Security Object instance relates to a LWM2M Bootstrap Server.

LWM2M Clients MUST either be directly provisioned for use with a target LWM2M Server (Manufacturer Pre-configuration bootstrap mode) or else be provisioned for secure bootstrapping with an LWM2M Bootstrap Server. Any LWM2M Client which supports Client or Server initiated bootstrap mode MUST support at least one of the following secure methods:

1) Bootstrapping with a strong (high-entropy) pre-shared secret, as described in section 7.1 of OMA LWM2M. The cipher-suites defined in this section MUST NOT be used with only a low-entropy pre-shared secret.

2) Bootstrapping with a temporary, low-entropy pre-shared secret (such as a PIN, password and private serial number) using the cipher-suite TLS_ECDHE_PSK_WITH_AES_128_CBC_SHA256, as defined in RFC5489.

3) Bootstrapping with a public key or certificate-based method (as described in sections 7.1.2 and 7.1.3 of OMA LWM2M). The LWM2M client MUST use a unique key-pair, one which is unique to each LWM2M client.

For full interoperability, a LWM2M Bootstrap Server SHALL support all of these methods.

NOTE: The above security methods can also be used by the LWM2M Bootstrap Server to provision KIc and KID for SMS channel security (see below for SMS channel security).

SMS Channel Security
SMS Secured Packet Structure Mode

The Secured Packet Structure is based on [3GPP TS 31 115]/[ETSI TS 102 225]] which is defining secured packets for different transport mechanisms. The solution was originally designed for securing packet structures for UICC based applications, however, for LWM2M it is suitable for securing the SMS payload exchanged between client and server.

The SMS Secured Packet Structure mode specified in this section MUST be supported when the SMS binding is used.

A LWM2M Client which uses the SMS binding MUST either be directly provisioned for use with a target LWM2M Server (Manufacturer Pre-configuration bootstrap mode or Smart Card Provisioning) or else be able to bootstrap via the UDP binding.

The end-point for the SMS channel (delivery of mobile terminated SMS, and sending of mobile originated SMS) SHALL be either on the smartcard or on the device. When the LWM2M Client device doesn't support a smartcard, the end-point is on the LWM2M Client device.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

Device End-point

If the SMS channel end-point is on the device the following settings SHALL be applied:
  Class 1 SMS as specified in [3GPP TS 23.038]
  TP-PID of 111101 (ME Data Download) as specified in [3GPP TS 23.040]
  TP-OA: the TP-OA (originating address as defined in [3GPP 23.040] of an incoming command packet (e.g. CoAP request) MUST be re-used as the TP-DA of the outgoing packet (e.g. CoAP response)

Smartcard End-point

If the SMS channel end-point is on the smart card the following settings SHALL be applied:
  Class 2 SMS as specified in [3GPP TS 23.038]. The [3GPP TS 23.040] SMS header MUST be defined as below:
    TP-PID: 111111 (USIM Data Download) as specified in [3GPP TS 23.040]
    TP-OA: the TP-OA (originating address as defined in [3GPP 23.040] of an incoming command packet (e.g. CoAP request) MUST be re-used as the TP-DA of the outgoing packet (e.g. CoAP response)

SMS Secured Packet Mode Mechanisms
1. Secure SMS Transfer to UICC

A SMS Secured Packet encapsulating a CoAP request received by the LWM2M device, MUST be—according to [ETSI TS 102 225]/[3GPP TS 31.115]—addressed to the LWM2M UICC Application in the Smartcard where it will be decrypted, aggregated if needed, and checked for integrity.

If decryption and integrity verification succeed, the message contained in the SMS MUST be provided to the LWM2M Client.

If decryption or integrity verification failed, SMS MUST be discarded.

The mechanism for providing the decrypted CoAP Request to the LWM2M Client relies on basic GET_DATA commands of [GP SCP03]. This data MUST follow the format as below
  data_rcv_ ::=<address> <coap_msg>
  address ::=TP_OA; originated address
  coap_msg ::=COAP_TAG <coap_request_length> <coap_request>
  coap_request_length ::=16BITS_VALUE
  coap_request ::=CoAP message payload NOTE: In current LWM2M release, the way the LWM2M Client Application is triggered for retrieving the available message from the Smartcard is at the discretion of the device: i.e. a middle class LWM2M Device implementing [ETSI TS 102 223] ToolKit with class "e" and "k" support could be automatically triggered by Toolkit mechanisms, whereas a simpler LWM2M device could rely on a polling mechanisms on Smartcard for fetching data when available.

2. Secured SMS Transfer to LWM2M Server

For sending a CoAP message to the LWM2M Server, the LWM2M Client prepares a data containing the right TP-DA to use, concatenated with the CoAP message and MUST provide that data to the LWM2M UICC Application in using the [GP SCP03] STORE-DATA command.

According to [ETSI TS 102 225]/[3GPP TS 31.115] the Smartcard will be in charge to prepare (encryption/concatenation) the CoAP message before sending it as a SMS Secure Packet ([ETSI TS 102 223] SEND_SMS command).

The SMS Secured Packet MUST be formatted as Secured Data specified in section 7.3.1.2.

The Secure Channel as specified in Annex H SHOULD be used to provide the prepared data to the Smartcard.

The SMS channel security is provided by the Secured Packet Structure [ETSI TS 102 225] and [SCP080] which is defining secured packets for different transport mechanisms.

The solution was originally designed for securing packet structures for UICC based applications, however, for LWM2M it is suitable for securing the SMS channel between client and server.

The SMS channel security specified in this section MUST be applied when the SMS binding is used.

When the LWM2M device supports a smartcard, the security SHOULD be terminated on the smartcard. The LWM2M client SHOULD pass SMS messages to the smartcard for encryption and integrity protection before sending, and SHOULD pass encrypted SMS messages received from the LWM2M server to the smartcard for decryption and integrity checking.

A LWM2M Client which supports the SMS binding SHALL support the Secured Packet Structure as defined in

[ETSI TS 102 225] and [SCP080]. The LWM2M Client SHALL share the relevant keys—identified by KIc and KID—with a LWM2M Bootstrap Server during bootstrapping, or with a LWM2M Server otherwise.

A LWM2M Bootstrap Server which supports the SMS binding SHALL support the Secured Packet Structure as defined in [ETSI TS 102 225] and [SCP080].

A LWM2M Server which supports the SMS binding SHALL support Secured Packet Structure as defined in [ETSI TS 102 225] and [SCP080].

In SMS Secured Packet Structure mode, a CoAP message as defined in [CoAP] MUST be encapsulated in [3GPP 31.115] Secured Packets, in implementing—for SMS Point to Point (SMS_PP)—the general [ETSI 102 225] specification for UICC based applications.

The following applies to LWM2M Client and LWM2M Bootstrap Server and LWM2M Server:

- The "Command Packet" command specified in [3GPP 31.115]/[ETSI TS 102 225] MUST be used for both CoAP Request and Response message.
- The Structure of the Command Packet contained in the Short Message MUST follow [3GPP 31.115] specification.
- Single DES SHALL NOT be relied on.
- AES or Triple DES with three different keys MUST be used.
- Preferably, AES should be used. Where AES is used it should be used with CBC mode for encryption (see coding of KIc in [ETSI TS 102 225] section 5.1.2) and in CMAC mode for integrity (see coding of KID in [ETSI TS 102 225] section 5.1.3).
- SPI SHALL be set as follows (see coding of SPI in [ETSI TS 102 225] section 5.1.1).:
  cryptographic checksum
  ciphering
    The ciphering and crypto graphic checksum MUST use either AES or Triple DES
    Single DES SHALL NOT be used
    AES SHOULD be used
    When Triple DES is used, then it MUST be used in outer CBC mode and 3 different keys MUST be used
    When AES is used it MUST be used with CBC mode for ciphering (see coding of KIc in [ETSI TS 102 225] section 5.1.2) and in CMAC mode for integrity (see coding of KID in [ETSI TS 102 225] section 5.1.3
  process if and only if counter value is higher than the value in the RE
- Preferably, TAR (see coding of TAR in [ETSI TS 101 220], section 6) SHALL be set to a value in the range BF FF 00-BF FF FF.

NOTE: A TAR for LWM2M SMS security will be requested from ETSI SCP and the range above applies only until the TAR has been assigned.

- Secured Data: contains the Secured Application Message which MUST be coded as a BER-TLV, the Tag (TBD: e.g. 0x05) will indicate the type (e.g. CoAP type) of that message.

There will be two different TARs for terminating the security on the smartcard or on the device.

The ciphering and integrity keys and associated counter values SHOULD be held in a smart card or other tamper-resistant secure storage environment (e.g. embedded secure element). The client SHOULD pass MT SMS to the smart card/SE for decryption and integrity checking, and SHOULD pass MO SMS to the smart card/SE for encryption and integrity protection before sending.

If the keys and associated counter values are not stored in the above recommended way, they SHALL be treated as session keys with a lifetime no greater than the duration of the Registration Lifetime. The LWM2M Client SHALL acquire fresh discard the key material on each "Register" or "Update" operation, load fresh key material using one of the mechanisms described below, and reset the counters.

- Re-bootstrapping via the GBA Push mechanism, as described in [OMA DM v2.0] section 9.3.1.3. GBA Push uses a UICC to generate a so called Ks_(ext/int)_NAF shared secret both in the network and in the device. From this master key Ks_(ext/int)_NAF, two session secrets are then generated: the DMBEK and the DMBIK. The value of the KIc (ciphering key for SMS) SHALL be set by truncating DMBEK to the relevant key length (taking bits 0 to 127 for AES-128, or bits 0 to 167 bits for 3DES), and the value of the KID (integrity key for SMS) SHALL similarly be set by truncating DMBIK to the relevant key length (bits 0 to 127 for AES-128, or bits 0 to 167 for 3DES). The GBA Push Info SHALL be delivered to the LWM2M Client using a Class 1 SMS as specified in [3GPP TS 23.038] with a TP-PID of 111101 (ME Data Download) as specified in [3GPP TS 23.040].
- Re-bootstrapping from the Smart Card by one of the following methods:
  - Using the above-described GBA Push mechanism, specifically with GBA-U, and with the Smart Card generating the DMBIK and DMBEK from Ks_int_NAF.
  - Using Remote File Management (RFM) or Remote Application Management (RAM) as specified in [ETSI TS 102.226]. The LWM2M Server SHALL generate random new key data of appropriate length for KIc and KID and ensure these are delivered to the Smart Card by a Class 2 SMS as specified in [3GPP TS 23.038] with a TP-PID of 111111 (USIM Data Download) as specified in [3GPP TS 23.040], protected using the relevant OTA security keys for RFM or RAM.

The Smart Card SHALL place the updated session keys in the provisioning file EF_LWM2M_Bootstrap.

- Re-bootstrapping via the UDP binding, secured as described in Section 7.1 (UDP Security).

Where the UDP binding is unavailable, the LWM2M Server (or Bootstrapping Server) SHOULD send SMS to the LWM2M Client to refresh the session keys before the next attempted "Register" or "Update" operation. If the LWM2M Client attempts to contact the LWM2M Server using an expired registration, or attempts to "Register" or "Update" using a stale key, the LWM2M Server SHALL respond with an error (4.00 Bad Request) and SHALL send SMS to refresh the session keys. However, the LWM2M Server SHOULD send such SMS prior to the expiry of the current Registration, if the LWM2M Client is awake; or if the LWM2M Client is in a sleep cycle, the LWM2M Server (or Bootstrapping Server) SHOULD send such SMS on the next wake up. These measures will avoid a failed "Register" or "Update" operation.

As for Section 7.1 (UDP Security), where a session persists across sleep cycles, encrypted and integrity-protected storage SHOULD be used for the session keys and counters. Alternatively, new session keys SHALL be established by one of the above mechanisms on wake up from a sleep cycle.

Preferably, KIc, KID, SPI and TAR SHALL be stored in the "SMS Binding Key Parameters" Resource.

Preferably, the corresponding key values should be stored in the "SMS Binding Secret Keys" Resource.

A LWM2M Client which uses the SMS binding may either be directly provisioned for use with a target LWM2M Server (Manufacturer Pre-configuration bootstrap mode) or else be able to bootstrap via the UDP binding.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

LWM2M Object: LWM2M Security

Description: This LWM2M object provides the keying material of a LWM2M Client appropriate to access a specified LWM2M Server. One Object Instance SHOULD address a LWM2M Bootstrap Server These LWM2M object resources MUST only be changed by a LWM2M Bootstrap Server or SmartCard provisioning and MUST NOT be accessible by any other LWM2M Server.

Example Object Info:

| Object | Object ID | Object URN | Multiple Instances? | Mandatory? |
|---|---|---|---|---|
| LWM2M Security | 0 | | Yes | Yes |

Resource Info:

| Resource Name | Type | Range or Enumeration | Units | Descriptions |
|---|---|---|---|---|
| LWM2M Server URI | String | 0-255 bytes | — | Uniquely identifies the LWM2M Server or LWM2M Bootstrap Server, and is in the form: "coaps://host:port", where host is an IP address or FQDN, and port is the UDP port of the Server. |
| Bootstrap Server | Boolean | | — | Determines if the current instance concerns a LWM2M Bootstrap Server (true) or a standard LWM2M Server (false) |
| Security Mode | Integer | 0-3 | — | Determines which UDP channel security mode is used<br>0: Pre-Shared Key mode<br>1: Raw Public Key mode<br>2: Certificate mode<br>3: NoSec mode |
| Public Key or Identity | Opaque | | — | Stores the LWM2M Client's Certificate (Certificate mode), public key (RPK mode) or PSK Identity (PSK mode). The format is defined in Section E.1.1. |
| Server Public Key or Identity | Opaque | | — | Stores the LWM2M Server's or LWM2M Bootstrap Server's Certificate (Certificate mode), public key (RPK mode) or PSK Identity (PSK mode). The format is defined in Section E.1.1. |
| Secret Key | Opaque | | — | Stores the secret key or private key of the security mode. The format of the keying material is defined by the security mode in Section E.1.1. This resource MUST only be changed by a bootstrap server and MUST NOT be readable by any server. |
| SMS Security Mode | Integer | 0-255 | | Determines which SMS payload security mode is used (see section 7.2)<br>0: Reserved for future use<br>1: Secure Packet Structure mode device terminated<br>2: Secure Packet Structure mode smartcard terminated<br>3: NoSec mode<br>255: Proprietary modes |
| SMS Binding Key Parameters | Opaque | 6 bytes | — | Stores the KIc, KID, SPI and TAR. The format is defined in Section D.1.2. |

| Resource Name | Type | Range or Enumeration | Units | Descriptions |
| --- | --- | --- | --- | --- |
| SMS Binding Secret Keys | Opaque | 32-48 bytes | — | Stores the values of the keys for the SMS binding. This resource MUST only be changed by a bootstrap server and MUST NOT be readable by any server. |
| LWM2M Server SMS Number | Integer | | | MSISDN used by the LWM2M Client to send messages to the LWM2M Server via the SMS binding. The LWM2M Client SHALL silently ignore any SMS not originated from unknown MSISDN |
| Short Server ID | Integer | 1-65535 | — | This identifier uniquely identifies each LWM2M Server configured for the LWM2M Client. This resource MUST be set when the Bootstrap Server resource has false value. Default Short Server ID (i.e. 0) MUST NOT be used for identifying the LWM2M Server. |
| Client Hold Off Time | Integer | | s | Relevant information for a Bootstrap Server only. The number of seconds to wait before initiating a Client Initiated Bootstrap once the LWM2M Client has determined it should initiate this bootstrap mode |

UDP Channel Security: Security Key Resource Format

This section defines the format of the Secret Key and Public Key and Identity resources of the LWM2M Server and LWM2M Bootstrap Objects when using UDP Channel security. These resources are used to configure the security mode and keying material that a Client uses with a particular Server. The Objects are configured on the Client using one of the Bootstrap mechanisms described in Section 5.1 of OMA LWM2M. The use of this keying material for each security mode is defined in Section 7.1 of OMA LWM2M.

Pre-Shared Key (PSK) Mode

The PSK is a binary shared secret key between the Client and Server of the appropriate length for the Cipher Suite used [RFC4279]. This key is composed of a sequence of binary bytes in the Secret Key resource. The default PSK Cipher Suites defined in this specification use a 128-bit AES key. Thus this key would be represented in 16 bytes in the Secret Key Resource.

The corresponding PSK Identity for this PSK is stored in the Public Key or Identity resource. The PSK Identity is simply stored as a UTF-8 String as per [RFC4279]. Clients and Servers MUST support a PSK Identity of at least 128 bytes in length as required by [RFC4279].

Raw-Public Key (RPK) Mode

The raw-public key mode requires a public key and a private key of the appropriate type and length for the Cipher Suite used. These keys are carried as a sequence of binary bytes with the public key stored in the Public Key or Identity Resource, and the private key stored in the Secret Key Resource. The default RPK Cipher Suites defines in this specification use a 256-bit ECC key. Thus the Certificate Resource would contain a 32 byte public key and the Secret Key Resource a 32 byte private key.

Certificate Mode

The Certificate mode requires an X.509v3 Certificate along with a matching private key. The private key is stored in the Secret Key Resource as in RPK mode. The Certificate is simply represented as binary X.509v3 in the value of the Public Key or Identity Resource.

SMS Payload Security: Security Key Resource Format

This section defines the format of the Secret Key and Public Key and Identity resources of the LWM2M Server and LWM2M Bootstrap Objects when using SMS Payload security. These resources are used to configure keying material that a Client uses with a particular Server. The Objects are configured on the Client using one of the Bootstrap mechanisms described in Section 5.1. The use of this keying material is defined in Section 7.2.

The SMS key parameters are stored in the order KIc, KID, SRI, TAR (KIc is byte 0).

Ordering of bits within bytes SHALL follow ETSI TS 102 221 "Coding Conventions" (b8 MSB, b1 LSB).

Unbootstrapping

If a Security Object Instance is to be deleted, some related resources and configurations need to be deleted or modified. Therefore when Delete operation is sent via Bootstrap Interface, the Client MUST proceed following procedure.

1. If there is an Object Instance that can be accessed only by a Server of the Server Object Instance (i.e. the Server is Access Control Owner and the LWM2M Server can access the Object Instance only in an Access Control Object Instance), the Object Instance and the corresponding the Access Control Object Instance MUST be deleted 2. If an Object Instance can be accessed by multiple Servers including the Server which Security Object Instance is to be deleted, then:

An ACL Resource Instance for the Server in Access Control Object Instance for the Object Instance MUST be deleted If the Server is Access Control Owner of the Access Control Object Instance, then the Access Control Owner MUST be changed to another Server according to the rules below: The Client MUST choose the Server who has highest sum of each number assigned to an access right (Write: 1, Delete: 1) for the Access Control Owner. If two or more Servers have the same sum, the Client MUST choose one of them as the Access Control Owner.

3. Observation from the Server MUST be deleted
4. The Server Object Instance MUST be deleted
5. Client MAY send "De-register" operation to the Server Note: To monitor the change of Access Control Owner, the Server MAY observe Access Control Owner Resource.

Figure 5:
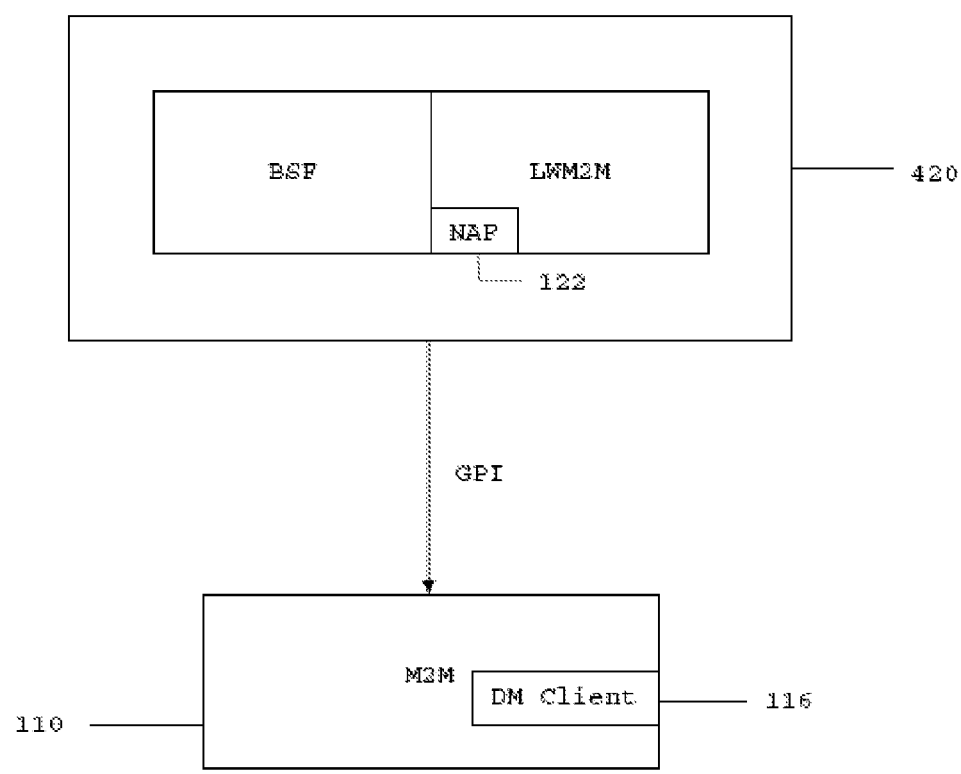
FIG. 5 shows a schematic diagram of a device management (DM) server in communication with a Machine to Machine (M2M) device.
Figure 6:
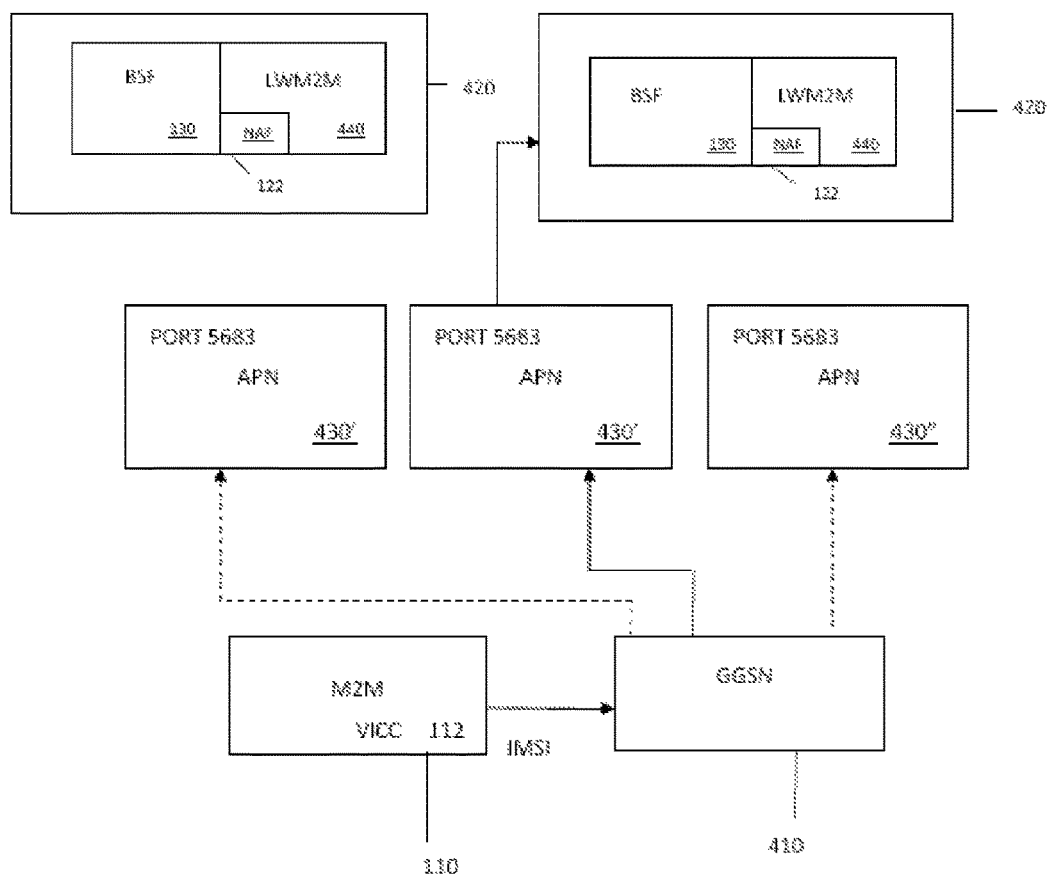
FIG. 6 shows a schematic diagram of a system and method for initiating communications between the DM server and M2M device of FIG. 5.
Figure 7:
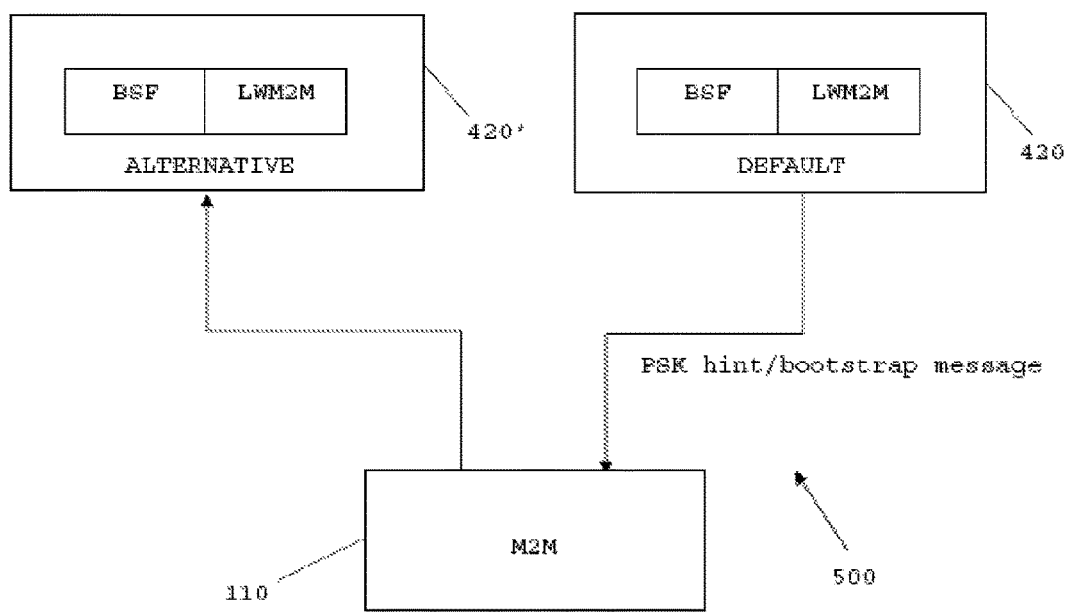
FIG. 7 shows a schematic diagram of a further system and method for initiating communications between the DM server and M2M device of FIG. 5.

As a further enhancement, the GBA BSF may be merged into the LWM2M bootstrap server. This makes it easier to discover a single server. This is shown in FIG. 5 in which a combined server 420 holds both the BSF 130 and the LWM2M 440.

Extensions for Use with Public Key Solutions

One problem with the key(s) derived using GBA is that they are based on the long-term secrecy of the underlying (U)SIM key, K or Ki. If that key ever leaks in the future, or if the operator is forced to disclose it for some reason, then any derived keys ever used in GBA may be considered compromised. An adversary or third party who had been recording all conversations with a device may potentially recover all past keys and messages protected by them.

One solution for this is to ensure that the GBA keys are only used temporarily when enrolling in a public key scheme: that scheme may for instance support "perfect forward secrecy" which avoids the problem of future key compromise leading to a recovery of all encrypted messages.

The 3GPP standard (GAA) provides some methods for using GBA to enroll for public key certificates. However, but they are particularly complex, and the necessary public key infrastructure (PKI) may be too great an overhead for LWM2M or other M2M protocols.

Authenticate "Raw" public keys from the client:

The M2M device may have a preloaded public-private keypair, or may generate a public-private key-pair on first power up. It presents its "raw public key" (or a hash of the raw public key) to the BSF, protected using HTTP digest and RES (this could be over a tunnelled Ub protocol, since that already requires some customisation). Alternatively, the raw public key may be presented to the NAF (LWM2M server or LWM2M bootstrapping server) protected using the GBA-derived key Ks_NAF. (The device could, for example, present its raw public key over CoAP, integrity protected using Ks_NAF, or present it within a CoAPs session secured using a pre-shared-key cipher suite and Ks_NAF).

The DM server (or bootstrapping server) may then use one of the public key ciphersuites, such as:

TLS_ECDHE_ECDSA_WITH_AES_128_CCM_8 as defined in Section 9.1.3.2 of [CoAP]
TLS_ECDHE_ECDSA_WITH_AES_128_CBC_SHA256 as defined in [RFC5289]

Alternatively, the DM Server may use a mixed pre-shared key/public key ciphersuite like:

TLS_ECDHE_PSK_WITH_AES_128_CBC_SHA256, as defined in [RFC5489] using the Ks_NAF as the pre-shared key.

Preferably, these ciphersuites may provide perfect forward secrecy. There may be several procedures that can be carried out before a Ks_NAF is established. In particular, these procedures may be carried out for devices that don't support GBA, or where the SIM card of the M2M device is not yet provisioned for GBA.

The device may present its raw public key unauthenticated, and the DM server or Bootstrapping may accept this raw public key temporarily. The device may use a weak secret (like PIN+IMSI+IMEI) together with TLS_ECDHE_PSK_WITH_AES_128_CBC_SHA256, for example, to secure a first connection with a bootstrap server.

These back-up methods provide no (or weak) authentication of the device public key, but they at least allow the protocol to get started, including providing the connectivity to tunnel GBA or run GBA-push, and so establish a subsequent strong authentication of the device pubic key.

Authenticate "Raw" public keys from the server.

As an alternative, or in addition to the above-mentioned procedure for authenticating "Raw" public keys from the client, the DM server may present its own "raw public key" to the client, protected by HTTP digest and RES, or other techniques, or by an integrity check or PSK session set up using the GBA-derived key Ks_NAF, for example. The similar cipher-suites to those described above may also be used to provide perfect forward secrecy.

If there has been no opportunity to establish a Ks_NAF then the device may require a preloaded copy or digest of the expected public key (e.g. the public key used by the LWM2M Bootstrap server) or a pre-loaded weak secret. This digest or secret may be retrieved from the SIM card (UICC) to avoid the need to provision directly to the device at manufacture. In an alternative, it may be sent to the device by SMS or the device may accept the raw server public key unauthenticated, at least at first connection.

Again, these back-up methods provide no (or weak) authentication of the server public key, but they at least allow the protocol to get started, including providing the connectivity to tunnel GBA or run GBA-push, and so establish a subsequent strong authentication of the server pubic key.

The above-mentioned techniques for authenticating "Raw" public keys from the client may also apply to certificate modes e.g. instead of a raw public key, the device may present a self-signed certificate (or certificate signed by an unknown CA). The server may present a self-signed certificate, or an unknown root CA certificate to M2M device. This also avoids the complexity and expense of provisioning the M2M device at manufacture with a public key certificate signed by a pre-existing CA (e.g device manufacturer's CA) or provisioning multiple root certificates.

These embodiments also allow the frequent refresh of private/public keys or certificates, which addresses some revocation problems. However, there is no need to do revocation checking, as the private/public key doesn't last long. The lifetime of the private/public key may be linked to the lifetime of a B-TID (or key_LT).

Alternatively, GBA could be used to secure messages from a trusted timesource (e.g. a network time), or provide a secure channel to retrieve certificate validation information (CRLs or OCSP responses.) This can address some problems with obtaining correct and up-to-date information for certificate validation.

Figure 8:
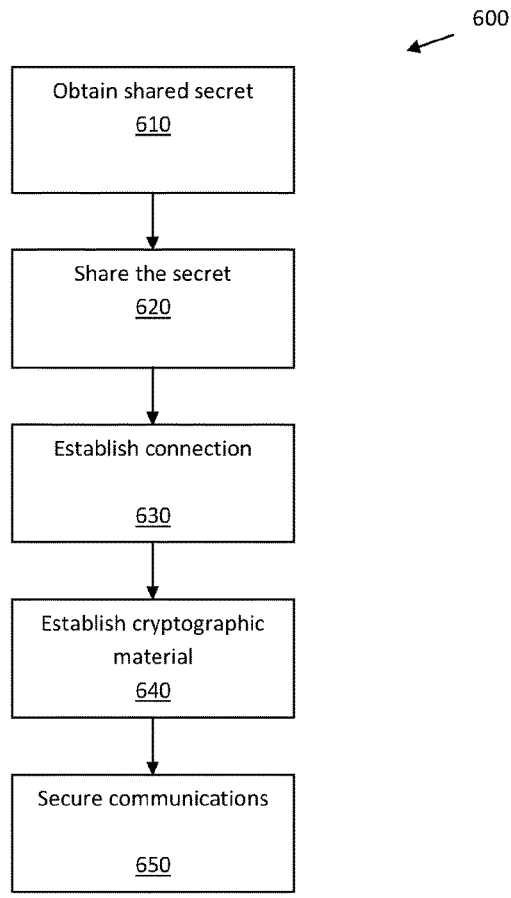
FIG. 8 shows a flowchart of a method for securely communicating with an M2M device.

FIG. 8 shows a flowchart of a method 600 for securely communicating with an M2M device in a way to protect the long term secrecy of communications. At step 610 a shared secret is obtained. This may be generated or retrieved from storage. Furthermore, shared secret may be obtained from the M2M device, the server or another source. The shared secret (or data derived from the shared secret, such as its hash) are shared between the M2M device and the server. This may be by simple transmission, SMS or other mechanism, for example. Authentication by the M2M device and/or server may also take place and may use the shared secret.

A connection is established, secured or initiated between the M2M device and the server at step 630. This connection utilises the shared secret or derived data. There may be some, weak (e.g. password, PIN, IMSI and/or IMEA derived secret) or no security or authentication involved in the connection. However, the shared secret may now be used establish cryptographic material between the M2M device and the server at step 640. In other words, the connection may have little or no security and the shared secret may have a low or lower level of security (as compared with the cryptographic material) but may nevertheless be used to provide corresponding cryptographic material at the M2M device and server. The cryptographic material may then be used to secure communication between the M2M device and the server (step 650). This secured communication uses a cryptographic protocol (e.g. TLS or SSL) and preferably a cryptographic protocol that provides perfect forward secrecy. The M2M device and the server may now communicate securely.

The shared secret may be a public key of a private key and public key pair, or a certificate (including self-signed, signed by a known certificate authority of signed by an unknown certificate authority), for example.

Preferably, the shared secret (e.g. key or certificate) is set to expire or be refreshed at intervals (e.g. every one, two, three or more days). The cryptographic material may be of a similar or different type to the shared secret. It may be more secure and may also have an expiry time (although this may be different to that of the shared secret).

Figure 9:
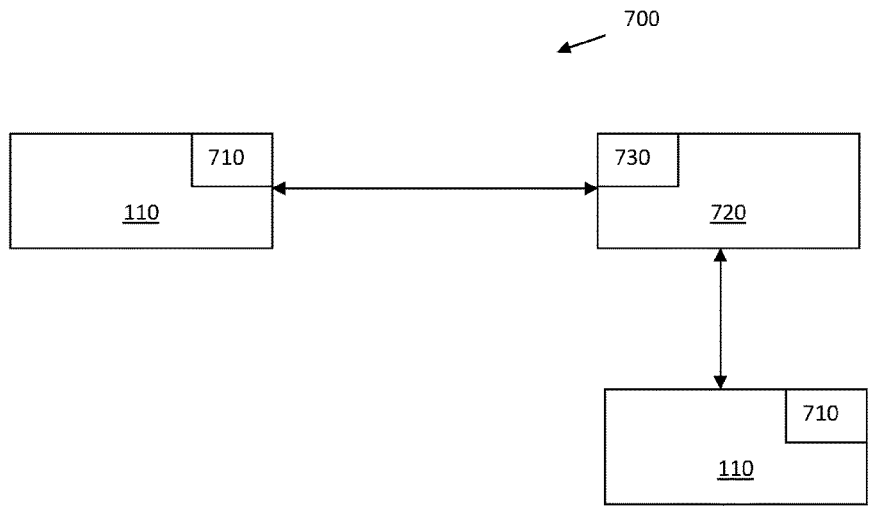
FIG. 9 shows a schematic diagram of a system for implementing the method of FIG. 8.

FIG. 9 illustrates schematically a system 700 used to implement the method 600 described with reference to FIG. 8. The system includes a server 720 including logic 730 to carry out the method. One or more M2M devices 110 communicate over connections with the server 720 in the manner described above. The M2M devices also include logic 710 used to implement the method. In the embodiment shown in FIG. 9, each M2M device 110 has a single connection with the server 720. In this implementation, the secure communication can be secured over this (typically) unsecure connection. However, in other embodiments a separate connection (of the same or of a different type) may be used for the secure communication to take place.

In the embodiments where the server 720 generates or retrieves the shared secret (e.g. key or certificate) then its own logic 730 will carry out this task. In the embodiments where the M2M Device 110 generates or retrieves the shared secret (e.g. key or certificate) then its own logic 710 will carry out this task.

The following describes particular uses of the perfect forward security and authentication of raw public key procedures or other secure communication methods. These include secure firmware updates, and secure broadcasts.

A M2M client device may be advised of a different server-side public key. This different public key may be used to sign firmware updates (over a unicast, broadcast or multicast or peer-to-peer system, for example).

This functionality may be extended to other sorts of secure broadcast, for example distributing a public key to sign public warning messages (bomb alerts, tsunami alerts), emergency messages (ambulance approaching, get out of the way), traffic alerts etc.

This procedure has the advantages of reduced or no PKI, and no or easier certificate validation. A public key (protected by a key established using GBA) may be sent where the public key is then used to verify broadcast messages or firmware updates, for example.

The LWM2M specification doesn't have a broadcast channel and firmware updates in LWM2M operate as follows:

The LWM2M Server performs a "Write" (or "Create") operation to alter (or create a new instance of) a "Firmware Update" object. It may write the update itself to a "Package" resource, but since updates are often large (and difficult to carry over CoAP), it most likely writes a URI to the "Package URI" resource.

If the "Package URI" resource has been written to, then the LWM2M Client "performs the download at the next practical opportunity". While downloading, the LWM2M client sets the "State" resource to "2" (which means "Downloading"). On completion of download, the LWM2M client sets the "State" resource to "3" (which means "Downloaded"). If the "Package" resource was written to directly, then when the LWM2M client has completed the Write operation, it sets the "State" resource to "3" straight away.

The LWM2M server can perform a "Read" operation whenever it likes in order to find out the value of the "State". When the state is "3" it can then perform an "Execute" operation on the "Update" resource, which instructs the LWM2M client to install the firmware update.

The LWM2M client sets the "Update Result" resource to indicate whether the update succeeded or failed, and any reason for failure. The client also sets the "State" resource back to "1" (which means "Idle").

The LWM2M server can perform another "Read" operation whenever it likes in order to find out the value of the "Update Result" and "State" resources.

No verification of the update package occurs in this process.

However, the following describes improvements to this method. These are illustrated in two example mechanisms. In these examples, a key is carried within LWM2M operations.

Mechanism 1 The LWM2M server performs a "Write" operation on the "Package" resource, but rather than writing the firmware update itself, it writes the (typically public) key that the LWM2M client requires in order to verify the firmware update. The LWM2M server simultaneously (or sequentially) performs a "Write" operation on the "Package URI" resource, telling the LWM2M client where it can find the update itself.

NOTE: The URI here may well take the form of a broadcast URI, for example—see http://tools.ietf.org/html/rfc2838—or http://www.etsi.org/deliver/etsi ts/102800_102899/102851/01.01.01_60/ ts_102851v010101p.pdf Once the LWM2M client has downloaded the update, then it can verify it using the public key that was written in the "Package" resource.

Mechanism 2 The LWM2M server performs a "Write" operation on the "Package URI" resource, but the URI contains an encoding of the public key that will be needed to verify the firmware update. For example, take the form of:

dvb://channel135/
key=9ICYfQ4RHZO3a3jb6hrQWRQiga7ImCqCaG9
JemD7F6r

Once the LWM2M client has downloaded the update, then it can verify it using the public key that was contained within the "Package URI" resource.

A key established by GBA may be used to secure a session between the LWM2M client and LWM2M server (for example the Ks_NAF is used as a DTLS pre-shared key) and then the second key is provided within that secured session.

In one example, residential gas meters may require firmware updates (e.g. a bug is discovered which means that they will incorrectly report gas consumed. Hackers may be trying to exploit this and a patch is required). The cellular operator provides some broadcast capabilities on their network—for example via MBMS. One of the broadcast channels is "free to air" (i.e. it is unencrypted) but consists of a stream of firmware updates for many types of M2M devices (gas meters, electricity meters, engine management systems etc.) Each update may be signed by a separate private key, and the key-pairs may be refreshed regularly (to ensure that only the most recent updates are signed by the latest keys).

When each gas meter next contacts the device management server, it is provided with an authenticated public key. The public key may be integrity protected using the shared secret (Ks_NAF) that has been established between the gas meter and M2M device management server using GBA. The gas meter then monitors the MBMS broadcast channel to detect when an update is being broadcast and which has been signed with the corresponding private key. It downloads the update, verifies it using the public key, and if verified installs the update.

In another example implementation, a third party organisation (commercial, government, or non-commercial, for example) may wish to introduce a new service or services and these services may be categorised by device type and device category (i.e. road traffic alerts may be an information-alert type having a device category as transportation. A tsunami warning system may be of type emergency public safety message, and device category "all". This taxonomical device categorisation system may be further refined to ensure that service advertisements were routed to appropriate devices.)

The third party organisation may inform a service provider (for example, a telecommunications service provider) of the service. The service provider may validate the service and may use the mechanism described above in relation to secure message broadcast to distribute a description of the service to devices.

This service could be used recursively to advise of other service advertisers. In other words, the service provide could advertise the existence of a Regulatory body (A government agency) that could be authorised to advertise government services.

These services may be of three types opt in, opt out and mandatory. In other words, a service for national security purposes advertised by a government agency may be mandatory, a service for road traffic alerts provided by a commercial company may be opt in and a service advertised by a government agency for a public safety purpose may be opt out.

In a further example, a third party organisation (commercial, government, or non-commercial) may wish to introduce one or more new services. These services may be categorised by device type and device category (i.e. road traffic alerts would be of type information-alert, and device category transportation, tsunami warning system would be of type emergency public safety message, and device category all. This taxonomical device categorisation system could be further refined to ensure that service advertisements were routed to appropriate devices.)

The third party organisation may inform a telecommunications network operator of the service. The network operator may validate the service and may use the method of communicating with M2M devices described above to distribute a description of the service to devices.

This service could be used recursively to advise of other service advertisers. In other words, a network operator could advertise the existence of a regulatory body (i.e. a government agency) that could be authorised to advertise government services, for example.

Examples services may be of three types in general: opt in/opt out/mandatory. For example, a service for national security purpose advertised by a government agency would be mandatory, a service for road traffic alerts provided by a commercial company would be opt in and a service advertised by a government agency for a public safety purpose could be opt out.

One example use of GBA keys is to protect SMS (encrypt/integrity protect SMS using secure packet interface e.g. like ETSI TS 102.225 which is used for SIM OTA).This SMS channel is likely to be more efficient than DTLS.

Encrypted SMS functionality is currently missing from OMA LWM2M. In other implementations, a secured SMS protocol may be used with a Device management protocol. For example:

a) Using a secure SMS protocol, originally designed for SIM OTA (102 225), but now adapted for LWM2M communications, and b) Using the LWM2M protocol to define (and manage) the necessary parameters for a secure SMS protocol, e.g. the relevant KIc, KID, SRI, TAR, and keys.

Use of GBA then becomes a further extension to this idea, as it is used to securely derive the keys.

In one particular example, an industrial thermostat system (e.g. in a warehouse) may have the temperature set remotely via a device management server. Since the temperature data is very short (just a number in degrees C.), then it (or any other data) may be transmitted in a single SMS, for example using the OMA LWM2M protocol with a SMS bearer.

Therefore, there is a need to protect the SMS to prevent malicious tampering with the thermostat (or other equipment that may rely on sensor or parameter data) and possible damage to goods stored in the warehouse, unnecessary energy bills etc. The SMS may be encrypted and integrity protected using the secure packet protocol described in ETSI TS 102 225. First, GBA is used to establish a KS_NAF between the thermostat and the LWM2M server. For convenience, an initial SMS may be used to deliver a GPI (GBA push info) message from the LWM2M server to the thermostat.

This GPI contains an authentication challenge to pass to a SIM card (UICC), which might be in the thermostat, or perhaps elsewhere in the warehouse network (it might be in a communications hub). The challenge is processed by the USIM application on the SIM card, and a CK and IK are returned.

These are then used to derive the Ks, and then the Ks_NAF which is passed to the thermostat. The thermostat (or other equipment) then extracts keys for the Kc and Kid and stores them for use by the LWM2M client on the thermostat. A solution could be as follows: The Ks_NAF is 256 bits (or total number of bits); the first 128 bits (or set of bits) are used as an AES encryption key (for the Kc) and the last 128 bits (or next or final set of bits) are used as an integrity key (for the Kid). Once this has been set up, an encrypted and integrity protected SMS with the desired temperature can be sent whenever needed from the LWM2M server to the LWM2M client on the thermostat. The client then decrypts and verifies the desired temperature, and the thermostat sets that temperature (or device changes a particular setting or parameter).

Automated Test-suite.

In this example implementation, an automated test-suite may be used by added value service providers that could be used to supply additional maintenance services (in this case diagnostics and performance analysis) for the purpose of ensuring optimal device behaviour. Typically, this would be a service offered by the original device vendor as an added-value service. However, it is feasible that specialist service providers might supply these services (e.g. car maintenance/tuning service). The benefit to the equipment vendor is that it creates a revenue and on-sell opportunities. Another use case would be where there was a complex device ecosystem (e.g. a home area network (HAN) with many peripheral devices of different types). A HAN maintenance service provider would have (or would create) signature data for a correct and incorrect operation of supported devices and would provide diagnostic services for those devices.

Other messaging channels (and this applies to all the described examples) could be conventional DSL and WiFi where there was a low level of security over the physical infrastructure and easy to intercept and interfere with communications.

Use GBA to send a secured message which starts a self-test/diagnostic test of device. This covers LWM2M functionality, or general functionality. Results of the self-test can also be reported back using a GBA-secured message. This could build on SMS security, as described in Idea 16, or use a different messaging channel.

For performance, and power-management reasons, we don't want just anyone to be able to trigger a self-test, which is why this should be a secured message. Also, for privacy and security reasons, we don't want the results of the self-test to be revealed to anyone who asks. However, it is unlikely that anyone would ever set up special strong security just to do this. So it is a good use-case for GBA as opposed to other security architectures.

End-of-life Sale and Decommissioning of Device.

This example implementation illustrates the ability to create a trust relationship between devices and service providers, creates opportunities to offer security services to all devices in a symmetric fashion. For example, a toaster can be used as an appliance to facilitate a user to vote in a Government election, and an e-purse can acquire road traffic information. Security services can be offered on an any-to-any basis in a device agnostic fashion. In the end of life cases, the authorisation for the device to participate in an auction to sell itself or/and to procure a replacement would be supplied by the owner of the appliance (by some means), and the responsibility for participating in an auction sale/bid would be delegated to the device in question.

Once the trust relationship is in place, it creates an opportunity to add value. In the end of life case, this could include providing service/life histories to potential buyers or scheduling collection of the device for disposal and recycling.

The device may use a secure association established using GBA to list itself on eBay for example, and order a replacement.

These sorts of automated sale and order applications require strong security. Therefore, this is a good use of the particular described GBA implementation.

Security Keyring

This example implementation describes a mechanism for transferring security protected material in an asymmetric fashion, from a secured device using GBA, to a (potentially) unsecured device. Many examples can be given for this use case using the keyring analogy. These transfers may be automated or under user control or a combination of both.

A further extension of this would be symmetric use where two unrelated GBA aware appliances needed to exchange information (as described in WO2012/035340).

The devices recognise the presence and the identity of each other (i.e. they have visibility of each other such as a car passing through a toll booth. The toll booth could use an induction loop to detect the presence of a car, and use Bluetooth/RFID (or other sensor) to supply other information in plain text, for example) and would acquire signature information from the other device. Each device communicates by secure means to their Device Management platform the existence of the other device+security credentials+the security signatures (received and given). The Device Management platforms (which would have a pre-existing trust relationship between each other, such as by means of trusted CA certificates) then validate the supplied signatures for each device and negotiate security keys to support inter communication between the devices. (This may be a simple symmetric key). The derived keys are sent to the devices and the devices are then able to communicate with each other securely and initiate a monetary transfer (for example).

It is to be understood that the above description is given by way of example and only for the benefit of understanding the solution, and it must include also any combination of the above features, as well as any alterations, modifications or otherwise addition which could be done by a skilled person by use of his/her skills and/or general knowledge in the relevant and/or neighbouring art.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for securely communicating with a machine to machine (M2M) device comprising:

sharing a secret or data derived from the secret between the M2M device and a server;

establishing a connection between the M2M device and the server that utilizes the shared secret or data derived from the shared secret;

using the shared secret or data derived from the shared secret to establish cryptographic material on both the M2M device and the server, comprising the M2M device generating or obtaining a public key;

the server authenticating the public key of the M2M device using the shared secret or data derived from the shared secret; and the server deriving the cryptographic material from the public key of the M2M device, and wherein at least one of a communication between a bootstrapping server and the M2M device and a communication between the server and the bootstrapping server is utilized for authenticating the public key of the M2M device; and securing communication between the M2M device and the server with a cryptographic protocol using the established cryptographic material, wherein the cryptographic material is unrecoverable from the shared secret or data derived from the shared secret alone.

2. The method according to claim 1, wherein the cryptographic material is session keys to provide perfect forward secrecy, and wherein the cryptographic protocol is transport layer security (TLS), secure sockets layer (SSL), or datagram transport layer security (DTLS).

3. The method according to claim 1, wherein the shared secret is generated by or stored within the M2M device and the shared secret or data derived from the shared secret are sent to the server.

4. The method according to claim 1, wherein the shared secret is generated by or stored within the server and the shared secret or data derived from the shared secret are sent to the M2M device.

5. The method according to claim 1, wherein the data derived from the shared secret is obtained by applying a hash function or other fixed key derivation function to the shared secret.

6. The method according to claim 1, wherein the server is a device management server, device management bootstrap server, a lightweight M2M (LWM2M), server, a LWM2M bootstrap server, or a Network Application Function (NAF).

7. The method according to claim 1, wherein the server is a Bootstrapping Server Function (BSF).

8. The method according to claim 1, wherein the connection established between the M2M device and the server is unsecured, and wherein the secured communication between the M2M device and the server is over the connection.

9. The method of claim 8, wherein securing the connection between the M2M device and the server comprises providing Generic Bootstrapping Architecture (GBA) or GBA Push Info (GPI) messages over the connection.

10. The method according to claim 1, wherein the shared secret is used to establish, protect, endorse, or authenticate a certificate, a self-signed certificate, or a certificate signed by an unknown or unverifiable certificate authority.

11. The method according to claim 1, wherein the shared secret is used to establish, protect, endorse, or authenticate an authority key or certificate, and wherein the authority key is used to sign, endorse, or authenticate a public key or certificate for at least one of the device and the server.

12. The method according to claim 1, wherein the shared secret is used to perform at least one of verifying that a public key or certificate is still valid and authenticating an updated public key or certificate.

13. The method according to claim 1, wherein the shared secret is configured to expire at a predetermined time.

14. The method of claim 13, wherein the server operates to generate a transaction identifier configured to expire at a predetermined time, and wherein an expiry time of the shared secret corresponds with an expiry time of the transaction identifier.

15. The method of claim 1, further comprising obtaining information indicating a current time from a trusted time source, and wherein the information indicating the current time is obtained from messages from the trusted time source secured using GBA.

16. A method for securely communicating with a machine to machine (M2M) device comprising:
   sharing a secret or data derived from the secret between the M2M device and a server;
   establishing a connection between the M2M device and the server that utilizes the shared secret or data derived from the shared secret;
   using the shared secret or data derived from the shared secret to establish cryptographic material on both the M2M device and the server, wherein using the shared secret or data derived from the shared secret to establish the cryptographic material comprises:
   the server generating or obtaining a public key;
   the M2M device authenticating the public key of the server using the shared secret or data derived from the shared secret; and
   the M2M device deriving the cryptographic material from the public key of the server, and
   wherein at least one of a communication between a bootstrapping server and the M2M device and a communication between the server and the bootstrapping server is utilized for authenticating the public key of the server; and
   securing communication between the M2M device and the server with a cryptographic protocol using the established cryptographic material, wherein the cryptographic material is unrecoverable from the shared secret or data derived from the shared secret alone.

17. A method for securely communicating with a machine to machine (M2M) device comprising:
   sharing a secret or data derived from the secret between the M2M device and a server:
   establishing a connection between the M2M device and the server that utilizes the shared secret or data derived from the shared secret;
   using the shared secret or data derived from the shared secret to establish cryptographic material on both the M2M device and the server, wherein using the shared secret or data derived from the shared secret to establish the cryptographic material on both the M2M device and the server comprises:
   the M2M device generating or obtaining a public key and a corresponding private key;
   the server generating or obtaining a public key and a corresponding private key;
   the M2M device authenticating the public key of the server using the shared secret or data derived from the shared secret;
   the server authenticating the public key of the M2M device using the shared secret or data derived from the shared secret;
   the M2M device deriving the cryptographic material from the public key of the server and the private key of the M2M device; and
   the server deriving the cryptographic material from the public key of the M2M device and the private key of the server; and
   securing communication between the M2M device and the server with a cryptographic protocol using the established cryptographic material, wherein the cryptographic material is unrecoverable from the shared secret or data derived from the shared secret alone.

18. A system comprising:
   a server;
   one or more machine to machine (M2M) devices; and
   logic configured to:
      share a secret or data derived from the secret between the one or more M2M devices and the server;
      establish a connection between the one or more M2M devices and the server that utilizes the shared secret or data derived from the shared secret;

use the shared secret or data derived from the shared secret to establish cryptographic material on both the M2M device and the server; and secure communication between the M2M device and the server with a cryptographic protocol using the established cryptographic material, wherein the cryptographic material is unrecoverable from the shared secret or data derived from the shared secret alone, wherein:

the one or more M2M devices are configured to generate or obtain a public key and a corresponding private key, and wherein the server is further configured to generate or obtain a public key and a corresponding private key;

the one or more M2M devices are configured to authenticate the public key of the server using the shared secret or data derived from the shared secret;

the server is configured to authenticate the public key of the one or more M2M devices using the shared secret or data derived from the shared secret;

the one or more M2M devices are configured to derive the cryptographic material from the public key of the server and the private key of the M2M device; and the server is configured to derive the cryptographic material from the public key of the M2M device and the private key of the server.

* * * * *